United States Patent
Kawaguchi et al.

(10) Patent No.: US 12,528,647 B2
(45) Date of Patent: Jan. 20, 2026

(54) CART ALIGNMENT DEVICE, DELIVERY SYSTEM, AND CONTROL METHOD

(71) Applicant: FUJI CORPORATION, Chiryu (JP)

(72) Inventors: Koji Kawaguchi, Kasugai (JP); Hisato Sawanami, Kariya (JP); Takuya Oda, Toyoake (JP)

(73) Assignee: FUJI CORPORATION, Chiryu (JP)

( * ) Notice: Subject to any disclaimer, the term of this patent is extended or adjusted under 35 U.S.C. 154(b) by 327 days.

(21) Appl. No.: 18/041,482

(22) PCT Filed: Aug. 24, 2020

(86) PCT No.: PCT/JP2020/031871
§ 371 (c)(1),
(2) Date: Feb. 13, 2023

(87) PCT Pub. No.: WO2022/044082
PCT Pub. Date: Mar. 3, 2022

(65) Prior Publication Data
US 2023/0234778 A1    Jul. 27, 2023

(51) Int. Cl.
*B65G 1/04* (2006.01)
*B60P 1/64* (2006.01)

(52) U.S. Cl.
CPC .......... *B65G 1/0492* (2013.01); *B60P 1/6427* (2013.01); *B65G 2203/0266* (2013.01)

(58) Field of Classification Search
CPC .............................. B60P 1/6427; B60P 1/649
See application file for complete search history.

(56) References Cited

U.S. PATENT DOCUMENTS

| | | | |
|---|---|---|---|
| 779,964 A | 1/1905 | Porter | |
| 1,845,313 A * | 2/1932 | Mckinley | B08B 9/0843 134/59 |
| 2,188,374 A * | 1/1940 | Sanchez | B65G 69/30 414/538 |
| 2,216,972 A * | 10/1940 | Gibson | B60P 1/6427 414/500 |
| 2,858,774 A | 11/1958 | Batten | |

(Continued)

FOREIGN PATENT DOCUMENTS

| CN | 107539052 A | 1/2018 |
|---|---|---|
| CN | 109774734 A | 6/2019 |

(Continued)

OTHER PUBLICATIONS

International Search Report issued Oct. 20, 2020 in PCT/JP2020/031871 filed on Aug. 24, 2020, 3 pages.

*Primary Examiner* — Kaitlin S Joerger
(74) *Attorney, Agent, or Firm* — Oblon, McClelland, Maier & Neustadt, L.L.P.

(57) ABSTRACT

A cart alignment device of the present disclosure is used in a delivery system that delivers an article using a cart including a loading section for loading articles and a caster disposed in the loading section and having wheels capable of changing a movement direction of the loading section. The cart alignment device includes a rail member configured to guide the caster of the cart in a predetermined arrangement direction, and a disposition section configured to dispose and fix the rail member in a collection chamber for accommodating one or more carts.

16 Claims, 18 Drawing Sheets

(56) References Cited

U.S. PATENT DOCUMENTS

| | | | | |
|---|---|---|---|---|
| 3,204,797 | A | * | 9/1965 | Chandler ............... B60P 1/6427 414/501 |
| 3,228,542 | A | * | 1/1966 | Achammer ............... B60P 1/52 414/373 |
| 3,469,723 | A | * | 9/1969 | Dwinell ................ B60P 1/6427 410/67 |
| 3,749,268 | A | * | 7/1973 | Macomber ................ B60P 1/64 414/679 |
| 3,802,588 | A | * | 4/1974 | Lutz ..................... B60P 1/6427 198/300 |
| 3,833,139 | A | * | 9/1974 | Mahoney .................. B60P 1/38 414/501 |
| 4,009,792 | A | * | 3/1977 | Sano ........................ B60P 1/64 414/512 |
| 4,203,697 | A | * | 5/1980 | Cayton ................. B60P 1/6427 410/67 |
| 4,231,695 | A | * | 11/1980 | Weston, Sr. ........... B65G 67/20 410/67 |
| 4,804,302 | A | | 2/1989 | Andre |
| 5,374,151 | A | | 12/1994 | Matthews |
| 10,202,061 | B2 | | 2/2019 | Scherle et al. |
| 2012/0177467 | A1 | * | 7/2012 | Corrigan ............... B60P 1/6427 414/352 |
| 2016/0239799 | A1 | | 8/2016 | Burch et al. |
| 2016/0239801 | A1 | | 8/2016 | Burch et al. |
| 2016/0239802 | A1 | | 8/2016 | Burch et al. |
| 2016/0288687 | A1 | | 10/2016 | Scherle et al. |
| 2017/0129379 | A1 | * | 5/2017 | Boscher ................. B65G 69/30 |
| 2018/0056848 | A1 | * | 3/2018 | Koehler ................. B64D 9/003 |
| 2019/0127148 | A1 | | 5/2019 | Burleson et al. |
| 2023/0054968 | A1 | * | 2/2023 | van den Heuvel ... B60P 1/6427 |
| 2024/0190327 | A1 | * | 6/2024 | van den Heuvel ... B60P 1/6454 |
| 2024/0421841 | A1 | * | 12/2024 | Setterstrom .......... H04B 1/3827 |

FOREIGN PATENT DOCUMENTS

| | | |
|---|---|---|
| CN | 109923050 A | 6/2019 |
| DE | 937 340 C | 1/1956 |
| EP | 0 403 800 A1 | 12/1990 |
| EP | 3 290 330 A1 | 3/2018 |
| JP | 5-178455 A | 7/1993 |
| JP | 9-132070 A | 5/1997 |
| JP | 9-188417 A | 7/1997 |
| JP | 2002-249207 A | 9/2002 |
| JP | 3136222 U | 10/2007 |
| JP | 2010-222911 A | 10/2010 |
| JP | 2010-280435 A | 12/2010 |
| JP | 5633957 B2 | 12/2014 |
| KR | 10-2020-0044590 A | 4/2020 |
| WO | WO 2016/133609 A1 | 8/2016 |
| WO | WO 2019/090112 A1 | 5/2019 |

* cited by examiner

| CART LOADING | STOPPER | DETECTING SENSOR (THERE IS DETECTION) | | | |
|---|---|---|---|---|---|
| | | #4 | #3 | #2 | #1 |
| FIRST | #4 | OFF | NON-CORRESPOND-ING | NON-CORRESPOND-ING | NON-CORRESPOND-ING |
| SECOND | #3 | NON-CORRESPOND-ING | OFF | NON-CORRESPOND-ING | NON-CORRESPOND-ING |
| THIRD | #2 | NON-CORRESPOND-ING | NON-CORRESPOND-ING | OFF | NON-CORRESPOND-ING |
| FOURTH | #1 | NON-CORRESPOND-ING | NON-CORRESPOND-ING | NON-CORRESPOND-ING | OFF |

CART ALIGNMENT DEVICE, DELIVERY SYSTEM, AND CONTROL METHOD

TECHNICAL FIELD

The present specification discloses a cart alignment device, a delivery system, and a control method.

BACKGROUND ART

Conventionally, in a delivery system for delivering an article, there has been proposed an automatic moving vehicle that enters a lower portion of a cart with a caster and automatically moves the cart (for example, refer to Patent Literature 1). The automatic moving vehicle can move the cart without an operator. In addition, there has been proposed a delivery system including wheels for moving a cart on which articles are loaded (for example, refer to Patent Literature 2). In addition, there has been proposed a movement device which includes a chain having a predetermined length mounted on a conveying vehicle, a driving arm coupled to a distal end of the chain, and engagement means capable of engaging and disengaging the driving arm and a moving tank side, in which the chain is advanced in a direction of unwinding the chain to transfer the moving tank side to a station side, the moving tank is returned to the conveying vehicle from the station side by retreating the chain in a direction of drawing the chain, and further, the advancing direction of the driving arm by the chain is converted to convert the advancing direction of the driving arm in the opposite direction (for example, refer to Patent Literature 3). In addition, there has been proposed a lifting and movement device that is a device detachably attached to a loading platform of a vehicle for loading and unloading a load, at least including a pair of main rails provided in a front-rear direction at left and right end portions of the loading platform, a pair of overhanging rails detachably coupled to a rear end portion of the main rail and extending behind the loading platform, a support member for supporting a wire for lifting the load on a bridge-shaped main body portion running on the main rails and the overhanging rails, and a winch mechanism (for example, refer to Patent Literature 4).

PATENT LITERATURE

Patent Literature 1: U.S. patent Ser. No. 10/202,061
Patent Literature 2: U.S. Pat. No. 5,374,151
Patent Literature 3: JP-A-05-178455
Patent Literature 4: Japanese Utility Model Registration No. 3136222

BRIEF SUMMARY

Technical Problem

As described in Patent Literature 1, the cart on which articles are loaded includes a caster that pivots generally in a freely directed manner, so that the cart smoothly moves in a freely directed manner. However, in the collection chamber in which the carts are collected, although it is desired to align the carts as densely as possible in a predetermined narrow space, the storage may not proceed smoothly due to the freedom of the casters. In Patent Literatures 1 to 4, such a problem is not particularly considered, and it is demanded to more easily align the carts in the collection chamber.

The present disclosure has been made to solve such problems, and a principal object of the present disclosure is to provide a cart alignment device, a delivery system, and a control method that can more easily align carts in a collection chamber and further reduce a workload of an operator.

In addition, in such a delivery system, as described in Patent Literature 1, in order to further reduce the labor of the operator, the cart may be automatically moved by using an automatic moving vehicle. On the other hand, in a collection location of the delivery vehicle and the cart, a closure door for closing an opening portion may be disposed in the opening portion through which the cart is loaded and unloaded. Since the closure door needs to be opened and closed manually by the operator, it is desired to further reduce the workload on the operator of the delivery system.

The present disclosure has been made to solve such problems, and a principal object of the present disclosure is to provide an automatic movement device and a control method thereof capable of further reducing the workload of the operator in a delivery system of an article using a cart.

The present disclosure employs the following means in order to achieve the above-mentioned main object.

The cart alignment device disclosed in the present specification is a cart alignment device used in a delivery system that delivers an article using a cart including a loading section for loading articles and a caster disposed in the loading section and having wheels capable of changing a movement direction of the loading section, the cart alignment device including a rail member configured to guide the caster of the cart in a predetermined arrangement direction; and a disposition section configured to dispose and fix the rail member in a collection chamber for accommodating one or more carts.

In this cart alignment device, the carts are arranged in the arrangement direction while the casters capable of changing the movement direction are guided in a predetermined arrangement direction by the rail member disposed and fixed in the collection chamber. Although the casters that freely change the movement direction are often oriented in all directions and are difficult to be aligned in an orderly manner by merely loading them into the collection chamber, in this cart alignment device, the casters are aligned in the arrangement direction of the rail members by merely causing the casters to enter the rail members. Therefore, in the cart alignment device, it is possible to more easily align the cart in the collection chamber by a relatively simple structure called a rail member, so that it is possible to further reduce the workload on the operator. The cart alignment device may include a vehicle retaining member provided at the innermost portion of the rail member for restricting the movement of the cart in the arrangement direction. In this cart alignment device, since the cart is fixed at the innermost position by the vehicle retaining member, it is easy to load the carts one after another. Here, the "article" is not particularly limited as long as it is for delivery, and may include, for example, industrial products including units and components of machines and devices, general consumer products, foods, and fresh products. Examples of the "collection chamber" include a logistics center for collecting articles, a warehouse, a shop, and a cargo chamber of a mobile transporter for delivering articles. Examples of the mobile transporter include a vehicle such as an automobile or a train, a ship, and an aircraft.

DESCRIPTION OF EMBODIMENTS

Figure 1:
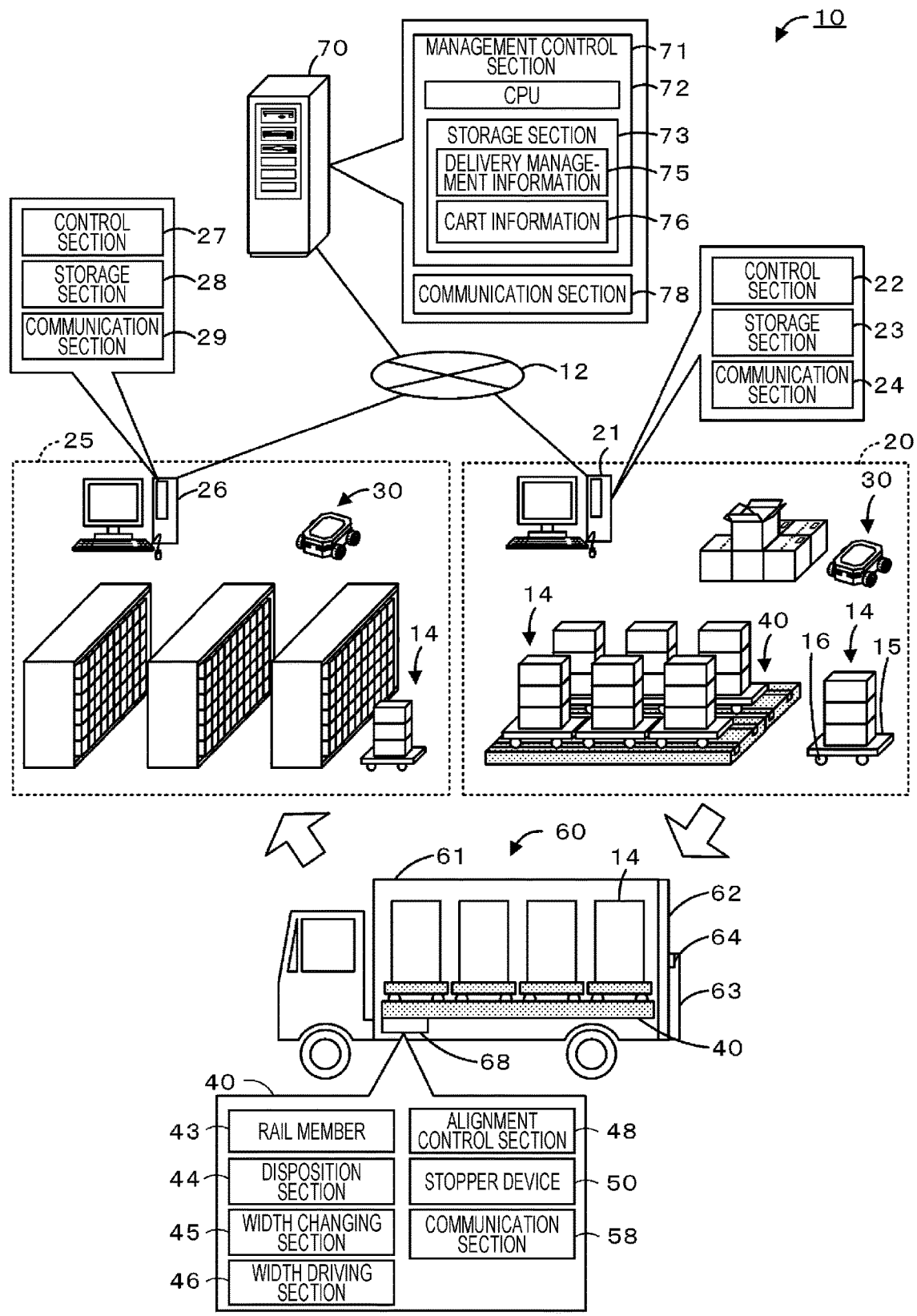
FIG. 1 is a schematic explanatory diagram illustrating an example of delivery system 10.
Figure 2:
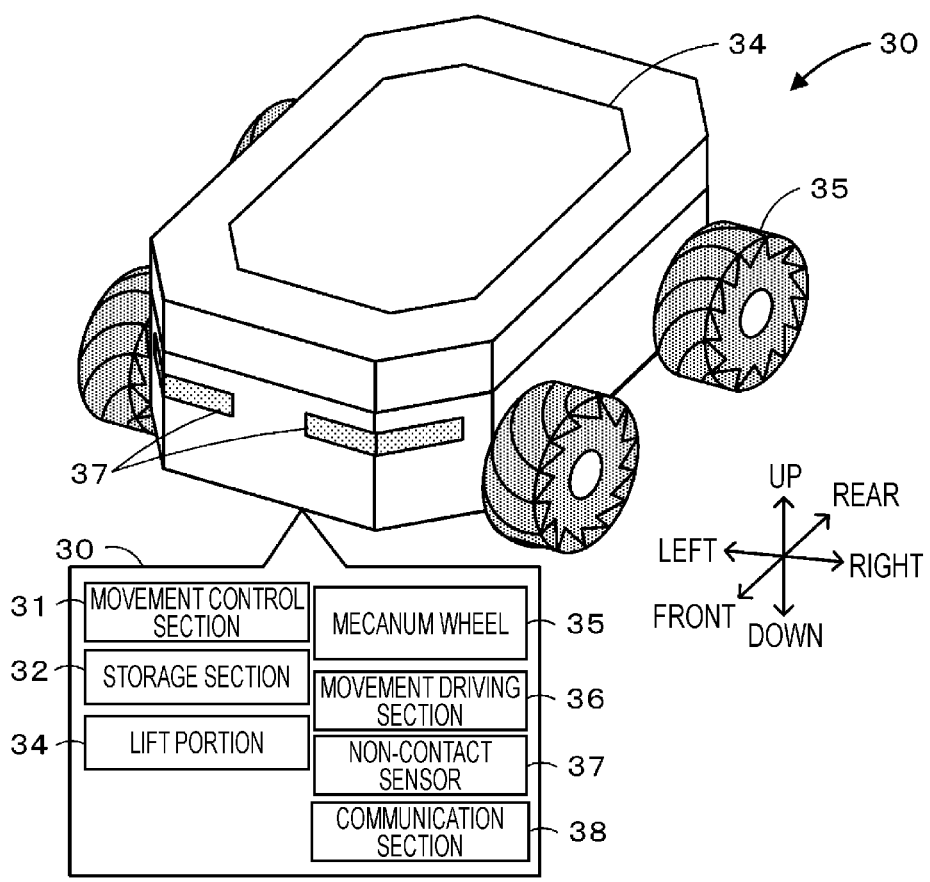
FIG. 2 is an explanatory diagram illustrating an example of automatic movement device 30.
Figure 3A:
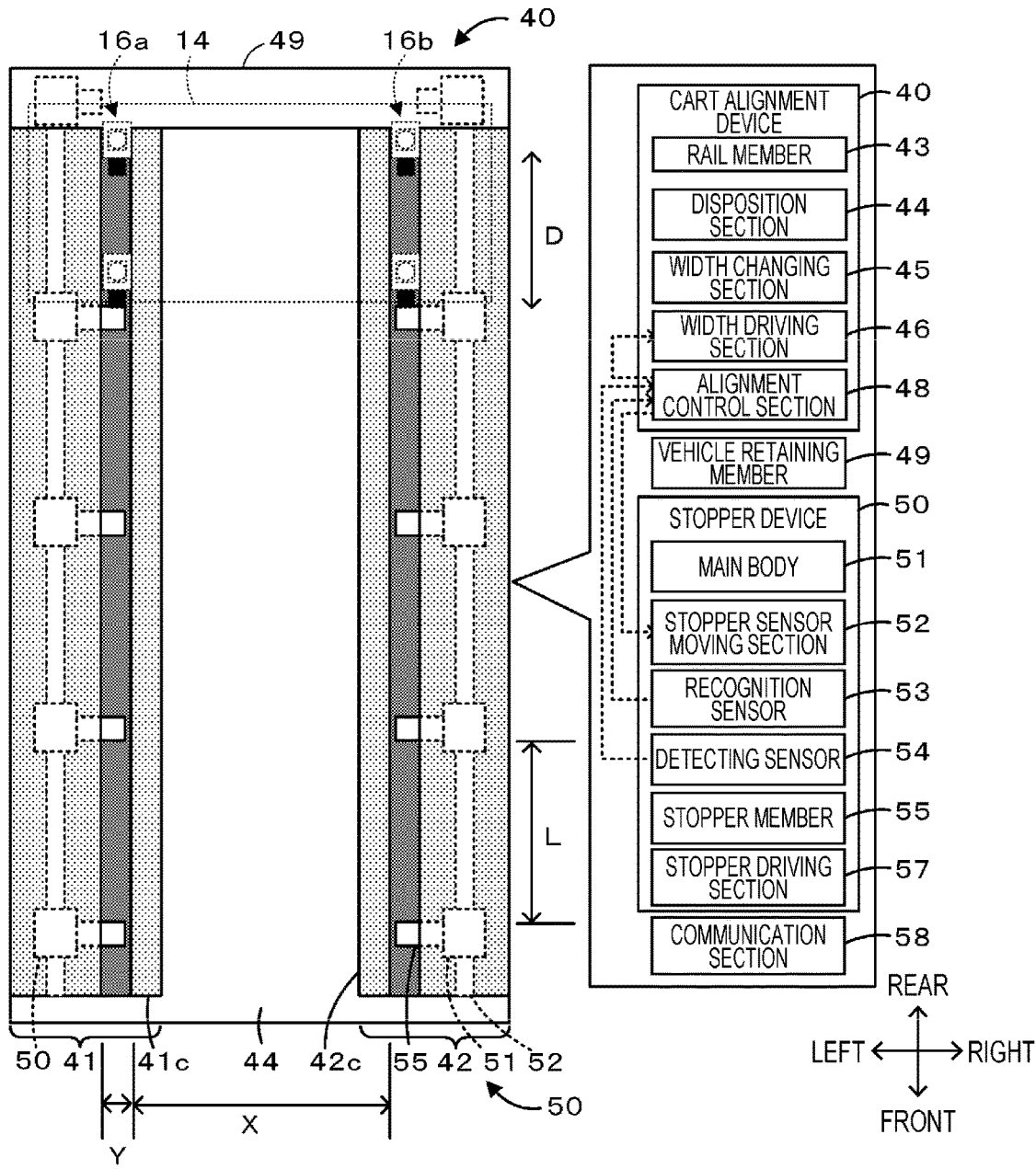
FIG. 3 is an explanatory diagram illustrating an example of cart alignment device 40.
Figure 3B:
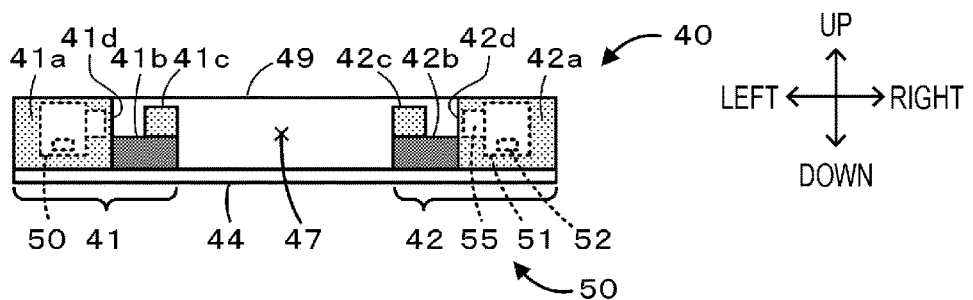
Figure 4:
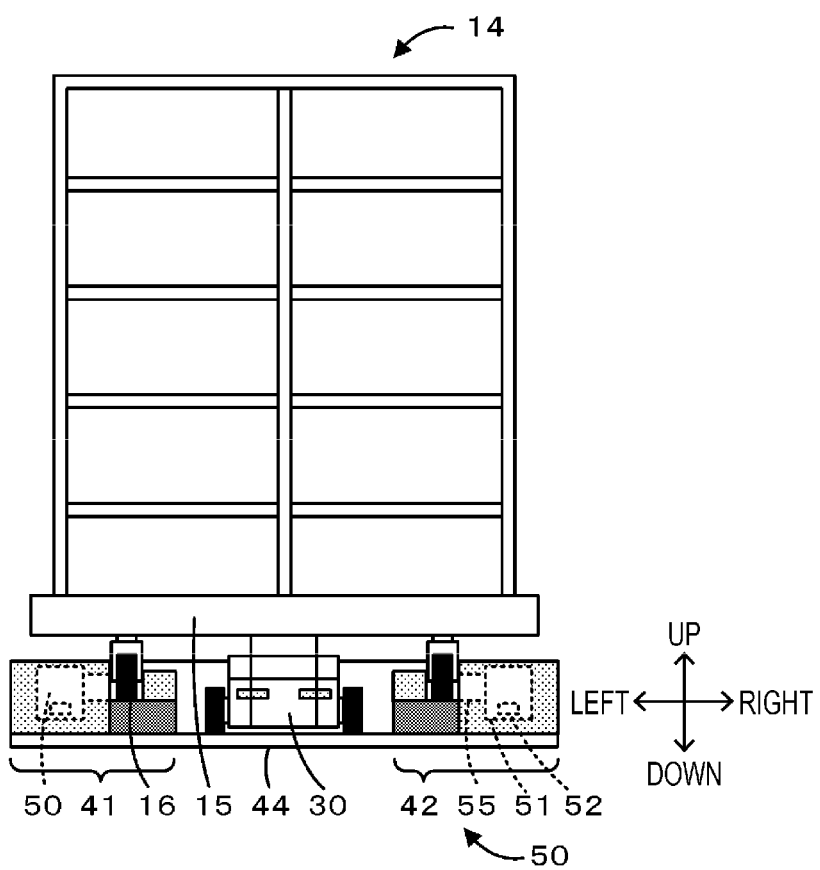
FIG. 4 is a front view of cart alignment device 40 into which cart 14 is loaded.
Figure 5:
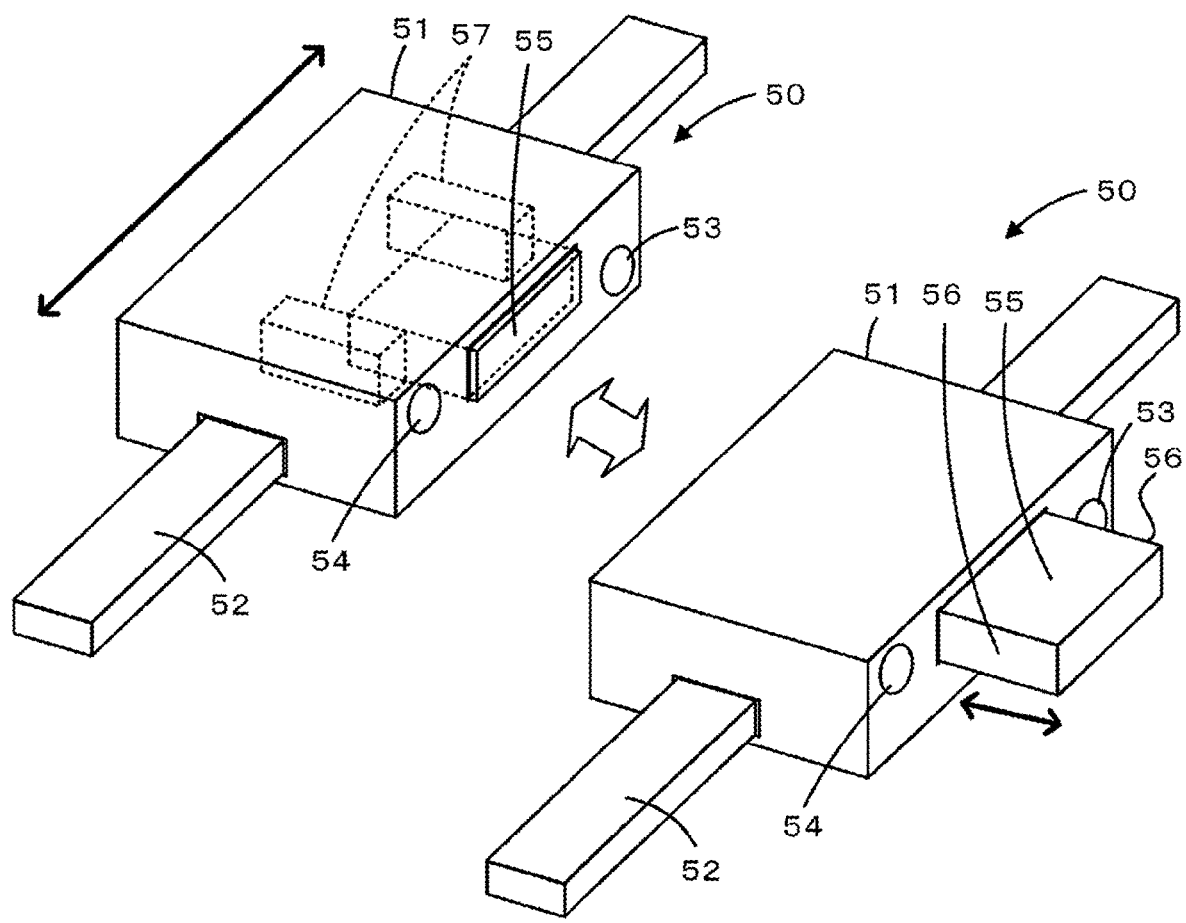
FIG. 5 is an explanatory diagram illustrating an example of stopper device 50.
Figure 6:
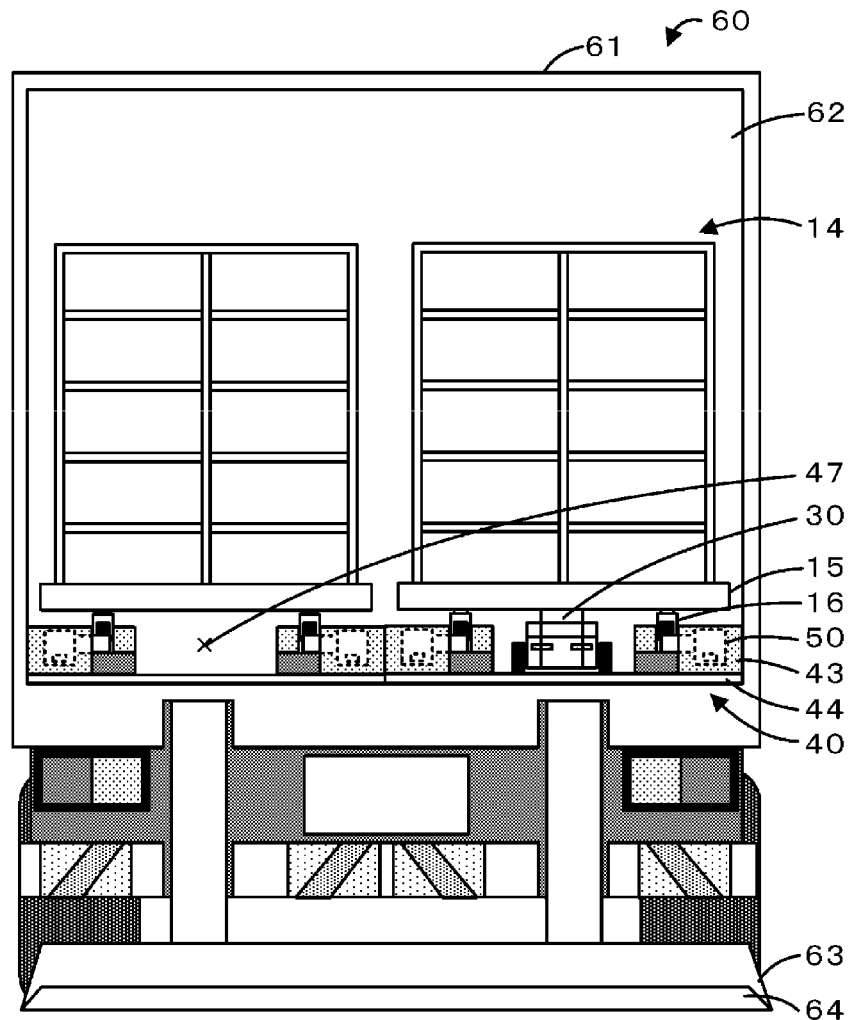
FIG. 6 is an explanatory diagram illustrating an example of delivery vehicle 60 as viewed from a rear side.

Embodiments of the present disclosure will be described with reference to the accompanying drawings. FIG. 1 is a schematic explanatory diagram illustrating an example of delivery system 10. FIG. 2 is an explanatory diagram illustrating an example of automatic movement device 30. FIG. 3 is an explanatory diagram illustrating an example of cart alignment device 40, in which FIG. 3A is a plan view and FIG. 3B is a front view. FIG. 4 is a front view of cart alignment device 40 into which cart 14 is loaded. FIG. 5 is an explanatory diagram illustrating an example of stopper device 50. FIG. 6 is an explanatory diagram illustrating an example of delivery vehicle 60 as viewed from a rear side. Delivery system 10 is a system for performing processing of delivering an article from a delivery source having a collection chamber in which carts 14 are collected to a delivery destination using carts 14. Here, the "article" is not particularly limited as long as it is for delivery, and may include, for example, an industrial product including a machine, a device, a unit, a component, or the like of a device, a consumer product, a food, a fresh product, or the like that is generally used for daily use. Examples of the "delivery source" and the "delivery destination" include a logistics center that collects and delivers articles, a warehouse that stores the articles, and a shop that sells the articles. In addition, the "collection chamber" includes, for example, cargo chamber 61 of delivery vehicle 60 in addition to the above-mentioned delivery source and delivery destination. For convenience of explanation, delivery system 10 for delivering products such as consumer products and fresh products by delivery vehicle 60 from logistics center 20 serving as the delivery source to shop 25 of the delivery destination will be mainly described. In the present embodiment, a left-right direction, a front-rear direction, and an up-down direction are described as illustrated in each drawing.

Cart 14 includes loading section 15 and caster 16. Loading section 15 is a plate-like member for loading articles. Caster 16 has wheels for driving cart 14, and is disposed on a lower surface side of loading section 15. Caster 16 is pivotally supported so as to rotate in a 360° direction about a rotation axis, so that a movement direction of loading section 15 can be freely changed. Cart 14 has four casters 16 arranged vertically and horizontally, two of which are also referred to as first row caster 16a and second row caster 16b (refer to FIG. 3A).

Logistics center 20 is a location for collecting articles and delivering the articles to shops 25 or other logistics centers 20 in various locations. Logistics center 20 has one or more automatic movement devices 30 that can automatically move cart 14. One or more cart alignment devices 40 are disposed on a floor surface of logistics center 20. Cart alignment device 40 is disposed, for example, for each specific area of the floor surface corresponding to the delivery destination. The operator performs an operation of placing the article on cart 14 according to the delivery destination. Automatic movement device 30 performs an operation of loading and unloading cart 14 to and from cart alignment device 40 for which the delivery destination is specified. Delivery vehicle 60 loads one or more carts 14 in logistics center 20, delivers the article to the delivery destination, and returns empty cart 14 to logistics center 20.

Shop 25 displays and sells the delivered articles. Shop 25 has one or more automatic movement devices 30, so that cart 14 can be automatically moved. Shop 25 has a display shelf on which the articles are displayed, and the operator displays the articles on the display shelf.

As illustrated in FIG. 1, delivery system 10 includes logistics PC 21, shop PC 26, automatic movement device 30, cart alignment device 40, and management server 70. Logistics PC 21 is disposed in logistics center 20 and performs product management or the like in logistics center 20. Logistics PC 21 includes control section 22, storage section 23, and communication section 24. Control section 22 has CPU, and controls the entire device. Storage section 23 stores various application programs and various data files. Communication section 24 communicates with external devices such as automatic movement device 30 and cart alignment device 40. Communication section 24 exchanges information with management server 70 and shop PC 26 via network 12. Storage section 23 stores delivery management information associating the delivery destination and the article with each other, cart information for managing carts 14 used in logistics center 20, and the like. The cart information also includes, for example, information such as caster width X (refer to FIG. 3A) which is a width of casters 16 of cart 14 with respect to each other, wheel width Y which is a width of the wheels of caster 16, and a size of loading section 15.

Shop PC 26 is disposed in shop 25 and performs product management or the like in shop 25. Shop PC 26 includes control section 27, storage section 28, and communication section 29. Control section 27 has a CPU, and controls the entire device. Storage section 28 stores various application programs and various data files. Communication section 29 communicates with an external device such as automatic movement device 30. Communication section 29 exchanges information with management server 70 and logistics PC 21 via network 12. Storage section 28 stores product management information associating the article with the display shelf, cart information for managing cart 14 used in shop 25, and the like. The cart information may include the same content as the cart information stored in logistics PC 21 and cart information 76 stored in management server 70.

Automatic movement device 30 is a vehicle that automatically moves the cart. Automatic movement device 30 enters a space between casters 16 on the lower surface side of loading section 15 of cart 14, connects to cart 14 by lifting loading section 15 from the lower side with lift portion 34, and moves cart 14. Automatic movement device 30 may be an Automatic Guided Vehicle (AGV) that moves on a predetermined road, or may be an Autonomous Mobile Robot (AMR) that detects surroundings and moves on a free route. Here, automatic movement device 30 having the AMR configuration will be described. In addition, for convenience of explanation, automatic movement device 30 disposed in logistics center 20 will be specifically described.

Automatic movement device 30 is configured as an Autonomous Mobile Robot (AMR) that detects the surroundings and moves on a free route. As illustrated in FIG. 2, automatic movement device 30 includes movement control section 31, storage section 32, lift portion 34, mecanum wheel 35, a movement driving section 36, non-contact sensor 37, and communication section 38. Movement control section 31 is a controller for controlling the entire device of automatic movement device 30. Movement control section 31 outputs control signals and the like to lift portion 34, movement driving section 36, and communication section 38, and inputs input signals from non-contact sensor 37 and communication section 38. Movement control section 31 obtains the movement direction, the movement distance, the current position, and the like of automatic movement device 30 based on the driving state of movement driving section 36 and the like. Storage section 32 stores various application programs and various data files. Storage section 32 stores, for example, map data of logistics center 20, a time schedule for moving cart 14, and the like. The map data and the time schedule are acquired by communication from logistics PC 21. Lift portion 34 is configured to be connected to cart 14 by pushing the lower surface of loading section 15 upward with respect to the main body of automatic movement device 30. Mecanum wheel 35 has a structure in which multiple rollers pivotally supported so as to be freely rotatable at an inclination of 45° with respect to the axle are disposed on a grounding surface side. Automatic movement device 30 includes four mecanum wheels 35, and is configured to be capable of moving automatic movement device 30 in all directions, spin turning, pivotal turning, slow turning, and the like by independently rotating each of mecanum wheels 35 in the front direction or the rear direction. Movement driving section 36 is a motor connected to each mecanum wheel 35 to rotationally drive connected mecanum wheel 35 to drive automatic movement device 30 to travel. Non-contact sensor 37 detects an object existing around automatic movement device 30 or a distance therebetween. Non-contact sensor 37 detects the presence or distance of an object, the distance thereof, and the like, for example, by irradiating the periphery with light such as a laser or a sound wave and detecting a reflected wave. Movement control section 31 controls the movement or stoppage of automatic movement device 30 based on the information from non-contact sensor 37. Communication section 38 wirelessly exchanges information with external devices such as logistics PC 21 and delivery vehicle 60.

Movement control section 31 moves to a position where cart 14 is present based on a command obtained from logistics PC 21 via communication section 38, connects to cart 14, and then moves cart 14 to a position of the moving destination along a set movement path. In addition, movement control section 31 has a function as a transmission control section for transmitting a signal to delivery vehicle 60. Movement control section 31 outputs, to delivery vehicle 60 via communication section 38, an opening signal for opening tail gate 62, a closing signal for closing the same, a control signal for moving tail lift 63 up and down, a control signal for driving fall prevention stopper 64, and the like.

Cart alignment device 40 is a device having a function of aligning and fixing multiple carts 14. As illustrated in FIGS. 3 and 4, cart alignment device 40 includes rail member 43, disposition section 44, width changing section 45, width driving section 46, alignment control section 48, vehicle retaining member 49, stopper device 50, and communication section 58.

Rail member 43 is a member that guides casters 16 of cart 14 in predetermined arrangement direction D. Rail member 43 has first row member 41 and second row member 42. First row member 41 guides first row caster 16a, and second row member 42 guides second row caster 16b. First row member 41 has main body 41a, lower member 41b, and guide member 41c. Main body 41a is an elongated member formed in the front-rear direction of FIG. 3A. Stopper device 50 is built in main body 41a. Lower member 41b is an elongated member bonded to a lower portion of main body 41a. Guide member 41c is disposed on an upper surface of lower member 41b in a slidable state in the left-right direction. An exposed upper surface of lower member 41b is a surface on which the wheels of caster 16 travel. Guide member 41c is an elongated member formed in the front-rear direction. A guide space through which the wheels of caster 16 pass is formed between vertical surface 41d of main body 41a and a vertical surface of guide member 41c (refer to FIG. 3B). An opening groove through which stopper member 55 can protrude into the guide space is formed in vertical surface 41d. Second row member 42 includes main body 42a, lower member 42b, and guide member 42c. Main body 42a, lower member 42b, guide member 42c, and vertical surface 42d have the same configurations as main body 41a, lower member 41b, guide member 41c, and vertical surface 41d, respectively, and detailed descriptions thereof will be omitted. First row member 41 and second row member 42 are disposed on disposition section 44 so as to face each other with guide member 41c inside. First row member 41 is immovably fixed on disposition section 44. On the other hand, second row member 42 is disposed on disposition section 44 so as to be slidable in the left-right direction by width changing section 45 and width driving section 46 disposed in the inside of vehicle retaining member 49. Rail member 43 is disposed on an end surface of disposition section 44 side of vehicle retaining member 49 so as to slidably move in a direction orthogonal to the longitudinal direction (arrangement direction D) of cart alignment device 40.

Disposition section 44 is a member for disposing and fixing rail member 43 in the collection chamber for accommodating one or more carts 14. Cart alignment device 40 is disposed and fixed to logistics center 20 and cargo chamber 61 of delivery vehicle 60 via disposition section 44. Disposition section 44 disposes and fixes rail member 43 in logistics center 20 serving as the collection chamber of the delivery source, cargo chamber 61 provided in delivery vehicle 60 serving as the collection chamber, or the like. In FIG. 3 and the like, disposition section 44 is a plate-like member, and is fixed to the floor surface with a screw (not illustrated). The disposition section is not particularly limited as long as rail member 43 is fixed to the floor surface, and may be the screw itself for fixing rail member 43 to the floor surface.

Width changing section 45 is configured to change the width between first row member 41 and second row member 42 of rail member 43. Width changing section 45 may be a mechanism for slidably moving rail member 43 along a groove formed in vehicle retaining member 49 or disposition section 44 (refer to FIGS. 8 and 9 described later). Width changing section 45 slidably moves main body 42a and lower member 42b of second row member 42, and slidably moves guide members 41c and 42c separately from this. Width changing section 45 changes caster width X which is the distance between first row caster 16a and second row caster 16b, and changes wheel width Y which is the width of the wheels included in first row caster 16a and second row caster 16b. Width changing section 45 changes wheel width Y by sliding guide member 41c in the direction orthogonal to arrangement direction D on lower member 41b. Width driving section 46 drives width changing section 45. Width driving section 46 may be a linear motor that slidably moves rail member 43. Rail member 43 has entrance space 47 into which automatic movement device 30 can enter between first row member 41 and second row member 42 (refer to FIG. 3B). Vehicle retaining member 49 is a member provided at the innermost portion of rail member 43 for restricting the movement of cart 14 in arrangement direction D. Vehicle retaining member 49 includes width changing section 45, width driving section 46, and the like. Communication section 58 wirelessly exchanges information with external devices such as logistics PC 21 and management server 70.

Stopper device 50 restricts the movement of cart 14 and cancels the restriction of the movement of cart 14 on cart alignment device 40. Stopper device 50 is provided within a predetermined range of rail member 43 according to the arrangement interval of carts 14, and fixes carts 14 and cancels the fixation of carts 14. The predetermined range of rail member 43 may be, for example, a range in which cart 14 is movable on cart alignment device 40. As illustrated in FIG. 5, stopper device 50 includes main body 51, stopper sensor moving section 52, recognition sensor 53, detecting sensor 54, stopper member 55, and stopper driving section 57. Main body 51 is a rectangular parallelepiped-shaped box supported by rails of stopper sensor moving section 52 so as to be movable in arrangement direction D. Main body 51 includes recognition sensor 53, detecting sensor 54, stopper member 55, and stopper driving section 57.

Stopper sensor moving section 52 includes a rail disposed inside rail member 43 in arrangement direction D, and a motor that moves main body 51 along the rail in the front-rear direction parallel to arrangement direction D. Stopper sensor moving section 52 has a function of the stopper moving section that moves stopper member 55 in arrangement direction D as well as a function of the sensor moving section that moves recognition sensor 53 and detecting sensor 54 in arrangement direction D. Stopper sensor moving section 52 moves stopper member 55 in the longitudinal direction of rail member 43, and fixes stopper member 55 at a position which is stopper interval L according to the arrangement interval of carts 14 (refer to FIG. 3A). In addition, stopper sensor moving section 52 moves recognition sensor 53 and detecting sensor 54 along rail member 43 and fixes them at positions according to the arrangement intervals of carts 14.

Recognition sensor 53 is a non-contact type sensor for recognizing cart 14 that is present in a predetermined range of rail member 43. Recognition sensor 53 only needs to be able to recognize the presence or absence of cart 14, and may be a non-contact type sensor that emits light to detect a reflected wave, or a switch type contacting sensor that comes into contact with cart 14 to output a signal. Alternatively, a camera for capturing an image of cart 14 and recognizing cart 14 may be used instead of recognition sensor 53. Recognition sensor 53 is disposed in main body 51 behind stopper member 55 and above the upper surfaces of guide members 41c and 42c. Detecting sensor 54 is a non-contact type sensor for detecting automatic movement device 30 serving as an object for moving cart 14. Detecting sensor 54 may be a sensor for detecting another object that moves cart 14, for example, the operator. Detecting sensor 54 may be any sensor as long as it can detect an object that moves cart 14, and can be, for example, a sensor similar to the one exemplified by recognition sensor 53.

Stopper member 55 is a columnar member on which restricting surface 56 against which caster 16 abuts and which restricts the movement of cart 14 is formed. Stopper member 55 is slidably disposed on main body 51 so as to protrude from vertical surface 42d of rail member 43 on the side surface of the wheel of traveling caster 16. Stopper driving section 57 moves stopper member 55 between a restricted position for restricting the movement of cart 14 (right view in FIG. 5) and a canceling position for allowing cart 14 to move (left view in FIG. 5). Stopper driving section 57 may move stopper member 55 by one or more of a magnetic force such as a solenoid, a change in a flow path of a fluid such as air, a linear operation gear, and the like. In stopper device 50, it is possible to confirm the presence or absence of cart 14 or automatic movement device 30, restrict the movement of cart 14 and cancel the restriction of the movement of cart 14, and the like.

Alignment control section 48 is a controller for controlling the entire device of cart alignment device 40. Alignment control section 48 outputs control signals and the like to width driving section 46 and stopper device 50, and inputs input signals from stopper device 50 and communication section 38. In addition, alignment control section 48 has a function of a width control section, a function of an interval control section, a function of a stopper control section, a function of a war area control section, a function of a count control section, and the like. The width control section performs processing of controlling width driving section 46 depending on the type of cart 14 and changing the width between first row member 41 and second row member 42. The interval control section performs processing of controlling stopper sensor moving section 52 depending on the type of cart 14 and adjusting the interval between stopper members 55. The stopper control section performs processing of inputting signals from recognition sensor 53 and detecting sensor 54, and driving and controlling stopper driving section 57 such that the movement of cart 14 is restricted and the restriction of the movement of cart 14 is canceled. The sensor position control section performs processing of controlling stopper sensor moving section 52 depending on the type of cart 14, and moving and fixing recognition sensor 53 and detecting sensor 54. The count control section receives a signal from recognition sensor 53, and performs processing of counting the number of carts 14 loaded into cart alignment device 40 and the number of carts 14 unloaded from cart alignment device 40. The count control section counts the number of carts 14 loaded into and the number of carts 14 unloaded from cart alignment device 40 counts the number of carts 14 loaded into cart alignment device 40 that is disposed and fixed in logistics center 20 serving as the collection chamber of the delivery source and the number of carts 14 unloaded from cart alignment device 40. In addition, the count control section performs processing of outputting a collection completion signal when the number of carts loaded on cart alignment device 40 reaches the delivery quantity to the delivery destination, and outputting a delivery permission signal when the number of carts 14 unloaded from cart alignment device 40 reaches the delivery quantity to the delivery destination.

Delivery vehicle 60 is a vehicle that loads and delivers one or more carts 14. As illustrated in FIGS. 1 and 6, delivery vehicle 60 includes cargo chamber 61, tail gate 62, tail lift 63, and fall prevention stopper 64. Cargo chamber 61 is a collection chamber in which carts 14 are collected, and cart alignment device 40 is fixed to the floor surface thereof. Tail gate 62 is provided at the rear portion of the vehicle, and opens and closes cargo chamber 61 by the closure door. Tail lift 63 loads cart 14, the operator, or the like on a work table that is horizontal when the closure door is released, and moves the work table up and down between the floor surface of cargo chamber 61 and the traveling surface of delivery vehicle 60. Fall prevention stopper 64 is provided at a distal end of tail lift 63 and operates between the restricted position for restricting the movement of cart 14 or the like and a restriction canceling position for canceling the restriction of the movement of cart 14 or the like, thereby preventing cart 14 or the article from falling. Fall prevention stopper 64 is a plate-like member, and pivots between the restricted position for causing the plate-like member to be a standing wall and the restriction canceling position for causing the plate-like member to be horizontal (refer to FIG. 15 described later). In delivery vehicle 60, tail gate 62, tail lift 63, fall prevention stopper 64, and the like can be mechanically operated by a motor, a hydraulic pressure, or the like. In addition, delivery vehicle 60 includes controller 68 and a communication section (not illustrated), and can operate tail gate 62, tail lift 63, fall prevention stopper 64, and the like by wireless signals or the like from the outside. In the present embodiment, the delivery of cart 14 is performed by delivery vehicle 60 of the truck, however, the configuration is not particularly limited to this, and may be performed by a mobile transporter such as a train, a ship, or an aircraft.

Management server 70 is a device that manages delivery system 10. Management server 70 includes management control section 71, storage section 73, and communication section 78. Management control section 71 includes CPU 72 and controls the entire device. Storage section 73 stores various application programs and various data files. Storage section 73 stores delivery management information 75 used to manage the delivery of the articles, cart information 76 for managing carts 14 used in logistics center 20 and shop 25, and the like. Delivery management information 75 includes delivery information in which the delivery destination and the article are associated with each other, correspondence information in which cart 14 on which the articles are loaded and the articles are associated with each other, schedule information including time at which cart 14 is delivered, and the like. Cart information 76 includes information such as caster width X (refer to FIG. 3A) which is the length of the width of casters 16 of multiple types of carts 14 used in delivery system 10, wheel width Y which is the width of the wheels of casters 16, and the size of loading section 15. Communication section 78 exchanges information with external devices such as logistics PC 21 and shop PC 26 via network 12. Management server 70 provides logistics PC 21 and shop PC 26 with information included in delivery management information 75 and cart information 76.

Figure 7:
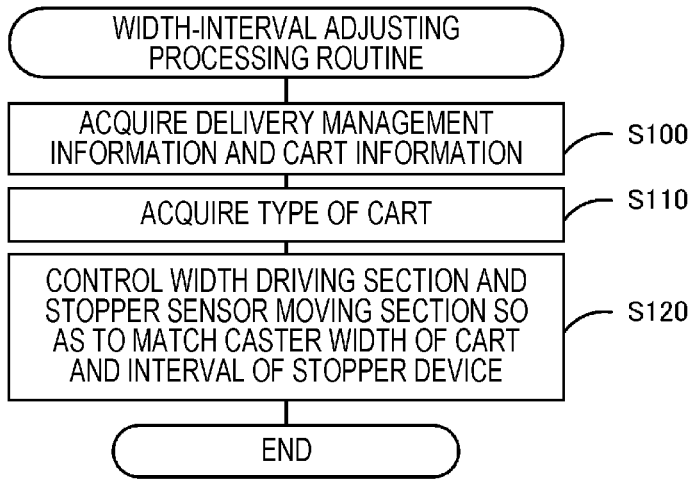
FIG. 7 is a flowchart illustrating an example of a width-interval adjusting processing routine.

Next, in delivery system 10 configured as described above, processing of changing caster width X, wheel width Y, and stopper interval L of cart alignment device 40 will be described. FIG. 7 is a flowchart illustrating an example of a width-interval adjusting processing routine executed by alignment control section 48 of cart alignment device 40. This routine is stored in the storage section of alignment control section 48 and is executed before cart alignment device 40 is used. When this routine is started, alignment control section 48 acquires delivery management information 75 and cart information 76 from management server 70 (S100), and acquires the type of cart 14 used in cart alignment device 40 (S110). Subsequently, alignment control section 48 controls width driving section 46 and stopper sensor moving section 52 based on the acquired information so as to match caster width X, wheel width Y, and stopper interval L of the type of cart 14 to be used this time (S120), and terminates the routine as it is.

Figure 8A:
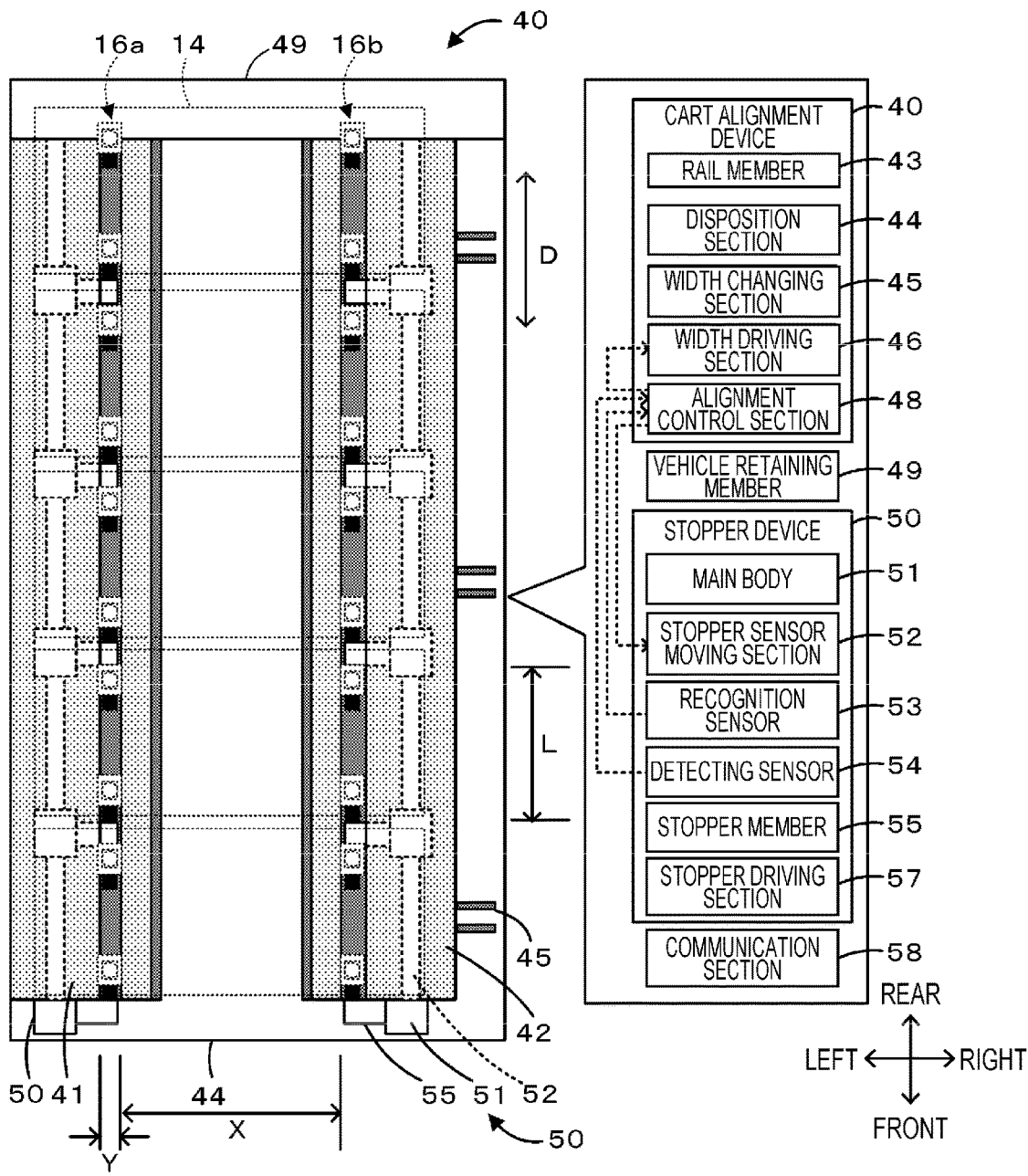
FIG. 8 is an explanatory diagram in which a width of cart alignment device 40 and an interval of stopper devices 50 are changed.
Figure 8B:
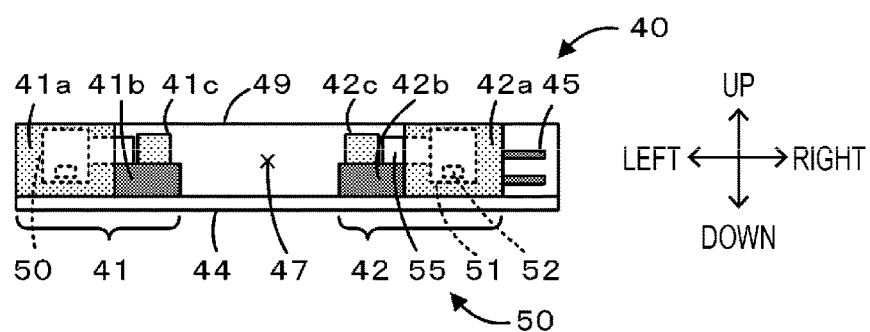
Figure 9:
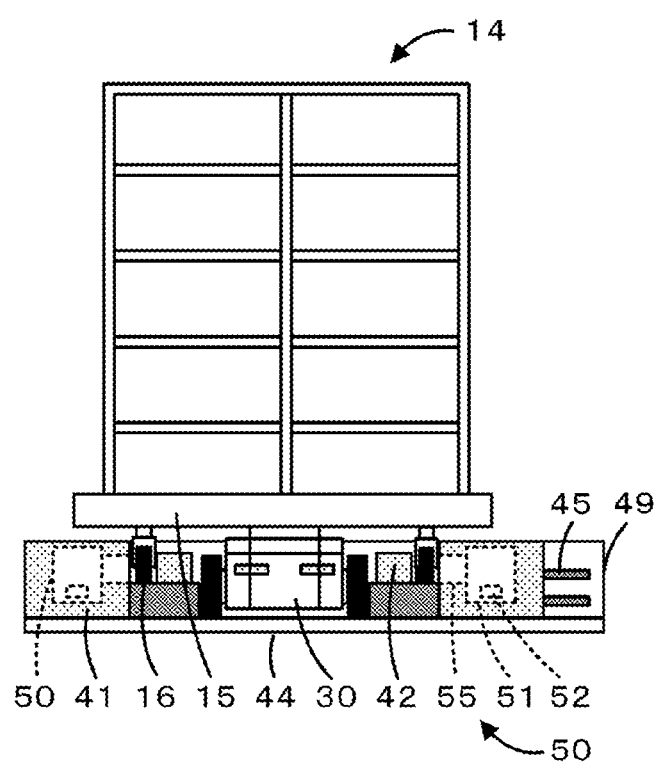
FIG. 9 is a front view illustrating a change in the width of cart alignment device 40 and the interval of stopper devices 50.

FIG. 8 is an explanatory diagram in which the width of cart alignment device 40 and the interval between stopper devices 50 are changed. FIG. 9 is a front view in which the width of cart alignment device 40 and the interval between stopper devices 50 are changed. For example, when cart 14 to be used next is smaller than the previous one, alignment control section 48 changes the positions of main body 42a and guide member 42c of second row member 42 by slidably moving the same by width driving section 46. In addition, alignment control section 48 changes the position of each stopper device 50 by moving and fixing the same by stopper sensor moving section 52. In cart alignment device 40, it is possible to reduce the workload and the time load of the operator by acquiring the information of cart 14 to be used next time and automatically moving each member.

Figure 10:
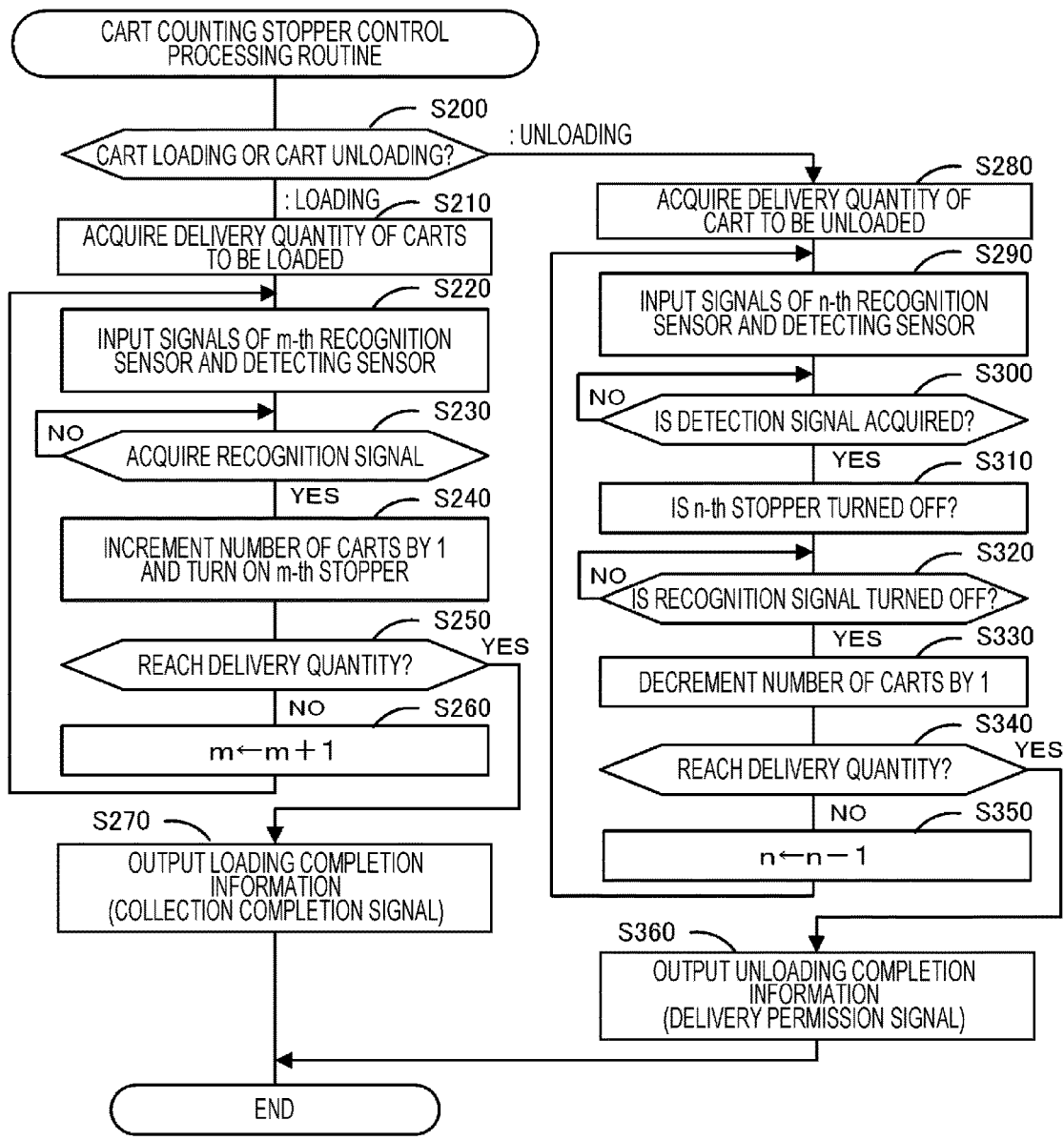
FIG. 10 is a flowchart illustrating an example of a cart counting stopper control processing routine.

Next, processing of counting the number of carts 14 to be delivered by cart alignment device 40 will be described. In a general logistics center, an area in which carts 14 are collected is set for each delivery destination and carts 14 are collected in that area. In this method, it is not easy to accurately determine whether all of carts 14 to be delivered are prepared to be delivered. In delivery system 10, cart alignment device 40 is disposed in logistics center 20, and can be used to count the number of carts 14 or to restrict the free movement of carts 14. FIG. 10 is a flowchart illustrating an example of a cart counting stopper control routine executed by alignment control section 48 of cart alignment device 40. This routine is stored in the storage section of alignment control section 48 and is executed when the cart alignment device 40 is used to collect and start of the delivery of carts 14. Prior to start this routine, the operator inputs to logistics PC 21 any of the loading of cart 14 into cart alignment device 40 and the unloading of cart 14 from cart alignment device 40 as an operation to be performed. Here, in the loading operation of cart 14 to cart alignment device 40, the operator or the arm robot performs an operation of loading the article on cart 14, and when the loading of the article on cart 14 is completed, the operation of moving cart 14 on which automatic movement device 30 has completed the loading to cart alignment device 40 is performed. In addition, in the unloading operation of cart 14 from cart alignment device 40, when the collection of carts 14 on which the loading of the articles is completed are completed and all carts 14 to be delivered to the delivery destination are prepared, automatic movement device 30 performs the operation of moving collected carts 14 to delivery vehicle 60.

When this routine is started, alignment control section 48 determines whether it is the loading operation of cart 14 or it is the unloading operation of cart 14 (S200). When it is the loading operation of cart 14 to cart alignment device 40 that is executed this time, alignment control section 48 acquires the delivery quantity of cart 14 to be loaded this time (S210). The delivery quantity is the total number of carts 14 to be delivered to the delivery destination this time. Alignment control section 48 acquires the delivery quantity from the information included in delivery management information 75. Next, alignment control section 48 inputs signals of m-th recognition sensor 53 and detecting sensor 54 (S220), and waits until a recognition signal from corresponding recognition sensor 53 is acquired (S230). Alignment control section 48 first sets m-th recognition sensor 53 to first recognition sensor 53. First recognition sensor 53 may be located, for example, at the deepest side of rail member 43 of cart alignment device 40 (refer to FIG. 11 and the like). At this time, alignment control section 48 may ignore signals of recognition sensors 53 other than m-th recognition sensor 53. Further, alignment control section 48 may utilize the signal input from detecting sensor 54 in an auxiliary manner. Automatic movement device 30 moves cart 14 along rail member 43, and loads cart 14 into the back of cart alignment device 40. At this time, casters 16 of cart 14 are guided by rail member 43 and are arranged in arrangement direction D. When automatic movement device 30 passes in front of detecting sensor 54, detecting sensor 54 outputs a detection signal to alignment control section 48. When cart 14 passes in front of recognition sensor 53, recognition sensor 53 outputs a recognition signal to alignment control section 48.

When the recognition signal is acquired from corresponding recognition sensor 53, alignment control section 48 increments the number of carts that have been loaded into cart alignment device 40 by 1, turns on m-th stopper device 50, and moves stopper member 55 to the restricted position (S240). Subsequently, alignment control section 48 determines whether the number of carts currently counted has reached the delivery quantity (S250), and when the same has not reached the delivery quantity, increments m by 1 (S260), and executes the processing of S220 and thereafter. That is, alignment control section 48 waits until the recognition signal from the next recognition sensor 53 is acquired, and repeats the processing of turning on next stopper device 50 when the recognition signal is acquired. On the other hand, when the number of carts reaches the delivery quantity in S250, alignment control section 48 determines that all carts 14 to be delivered this time have been loaded into cart alignment device 40, outputs the loading completion information to logistics PC 21 (S270), and terminates this routine. At the time of the completion of the loading of logistics center 20, alignment control section 48 may output a collection completion signal as the loading completion information. Logistics PC 21 that has acquired the loading completion information may display and output a message to the effect that the preparation of cart 14 to the corresponding delivery destination is completed on a display section such as a display. The operator who has confirmed this starts an operation of stocking carts 14 on which the collection has been completed onto delivery vehicle 60.

Figure 11:
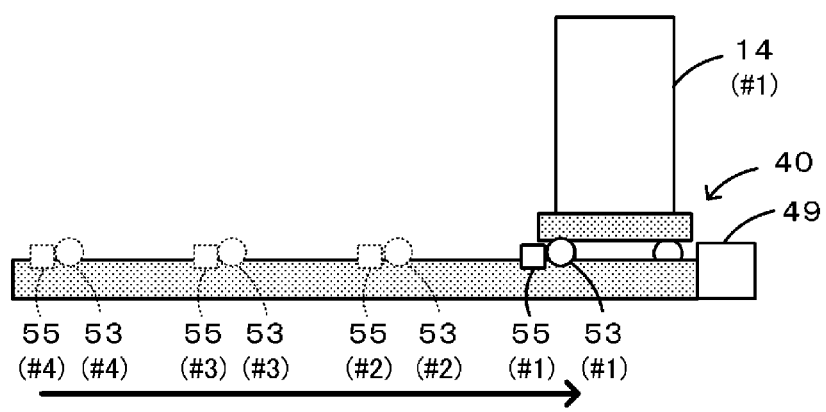
FIG. 11 is an explanatory diagram of an operation of a stopper operation based on a recognition signal of recognition sensor 53.
Figure 12A:
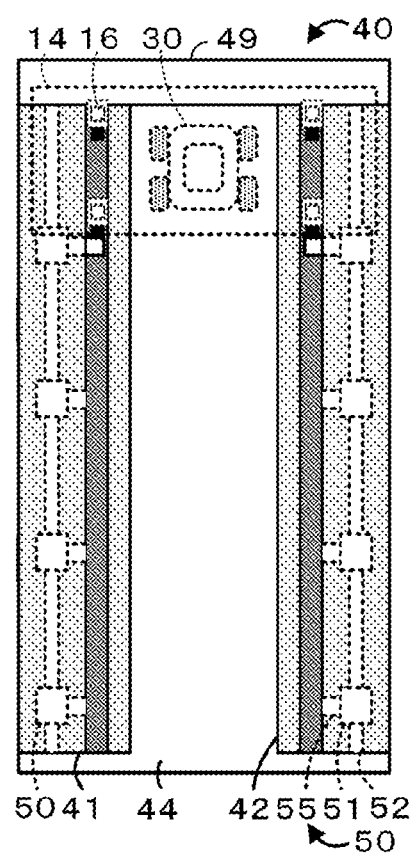
FIG. 12 is an explanatory diagram of an example of aligning carts 14 with cart alignment device 40.
Figure 12B:
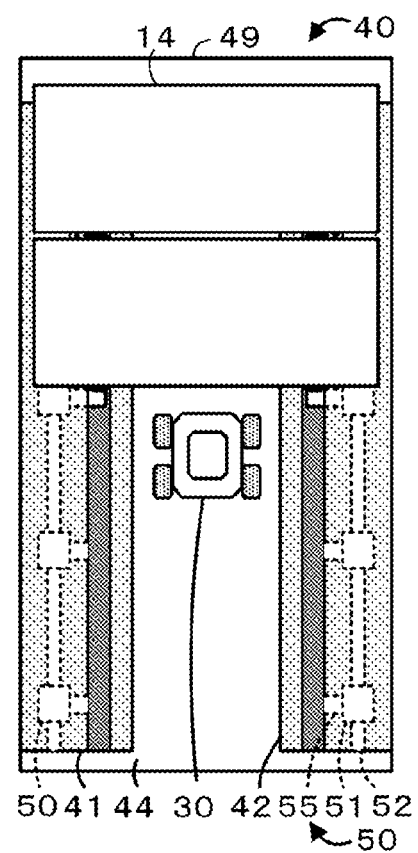
Figure 12C:
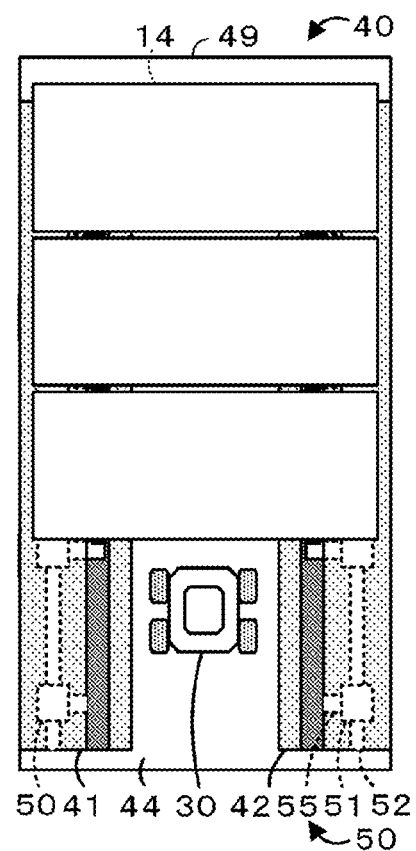
Figure 12D:
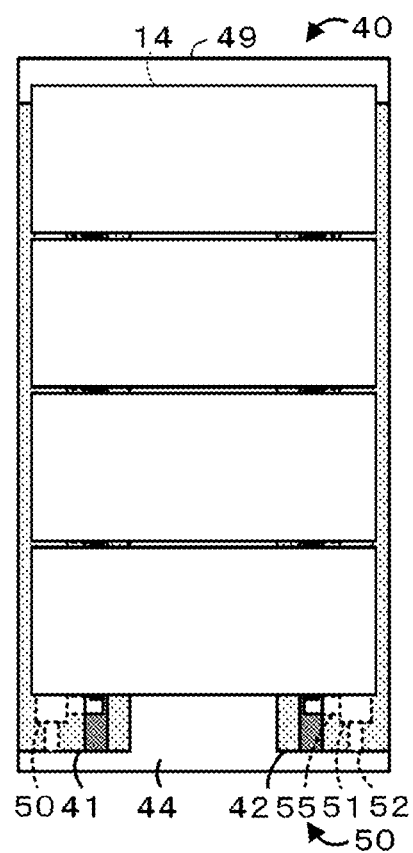

FIG. 11 is an explanatory diagram of the operation of the stopper operation based on the recognition signal of recognition sensor 53. FIG. 12 is an explanatory diagram of an example of aligning cart 14 with cart alignment device 40, in which FIG. 12A is an explanatory diagram after first cart 14 is loaded, FIG. 12B is an explanatory diagram after second cart 14 is loaded, FIG. 12C is an explanatory diagram after third cart 14 is loaded, and FIG. 12D is an explanatory diagram after fourth cart 14 is loaded. Here, a case where four stopper devices 50 are fixed and four carts 14 are loaded into cart alignment device 40 will be described as a specific example. As illustrated in FIG. 11, when first cart 14 is loaded and the recognition signal is input from recognition sensor 53 (#1), alignment control section 48 moves stopper member 55 (#1) to the restricted position to restrict the movement of cart 14 (FIG. 12A). At this time, cart 14 and automatic movement device 30 pass in front of recognition sensors 53 (#2 to #4), but alignment control section 48 ignores these signals. Subsequently, when automatic movement device 30 loads second to fourth carts 14 into cart alignment device 40, alignment control section 48 turns on stopper members 55 (#2 to #4), respectively (FIGS. 12B to 12D). When stopper device 50 is driven, the movement of cart 14 is restricted, so that alignment control section 48 can more reliably count the number of carts 14.

On the other hand, when performing the operation of unloading cart 14 from cart alignment device 40 in S200, alignment control section 48 acquires the delivery quantity of cart 14 to be unloaded this time (S280). When cart 14 after the loading is unloaded from cart alignment device 40, the value at the time of the loading can be used as the delivery quantity. Next, alignment control section 48 inputs the signals of n-th recognition sensor 53 and detecting sensor 54 (S290), and waits until a detection signal from corresponding detecting sensor 54 is acquired (S300). Alignment control section 48 first sets n-th detecting sensor 54 to fourth detecting sensor 54 that is the tail end. Fourth detecting sensor 54 may be located, for example, ahead of rail member 43 of cart alignment device 40 (refer to FIG. 13). At this time, alignment control section 48 may process the signals of detecting sensors 54 other than n-th detecting sensor 54 as non-corresponding. When acquiring the detection signal from corresponding detecting sensor 54, alignment control section 48 determines that automatic movement device 30 unloads corresponding cart 14, turns off n-th stopper device 50, and moves stopper member 55 to the restriction canceling position (S310). Next, alignment control section 48 waits until the recognition signal from recognition sensor 53 is turned off (S320). Automatic movement device 30 moves to the lower portion of cart 14, connects to cart 14, moves cart 14 along rail member 43, and unloads the same from cart alignment device 40. At this time, when automatic movement device 30 passes in front of detecting sensor 54, detecting sensor 54 outputs the detection signal to alignment control section 48. In addition, when cart 14 moves from the front of recognition sensor 53, recognition sensor 53 stops the output of the recognition signal to alignment control section 48.

When the recognition signal from recognition sensor 53 is turned off, alignment control section 48 decrements the number of carts of cart alignment device 40 by 1 on the assumption that automatic movement device 30 has unloaded cart 14 (S330), and determines whether the number of carts under count has reached the delivery quantity (S340). If the delivery quantity has not been reached, alignment control section 48 decrements n by 1 (S350), and executes the processing of S290 and thereafter. That is, alignment control section 48 waits until the detection signal from next detecting sensor 54 is acquired, and turns off next stopper device 50 when the detection signal is acquired, and repeats the processing of reducing the number of carts 14 when cart 14 is unloaded. On the other hand, when the number of carts reaches the delivery quantity in S340, alignment control section 48 determines that all carts 14 to be delivered this time are unloaded from cart alignment device 40, outputs the unloading completion information to logistics PC 21 (S360), and terminates this routine. When the unloading of logistics center 20 is completed, alignment control section 48 may output a delivery permission signal as the unloading completion information. Logistics PC 21 that has acquired the unloading completion information may display and output a message to the effect that cart 14 to the corresponding delivery destination has moved from the collection location, on and to the display section such as a display. The operator who has confirmed this starts an operation of moving delivery vehicle 60 for which the delivery has been permitted to the delivery destination.

Figure 13:
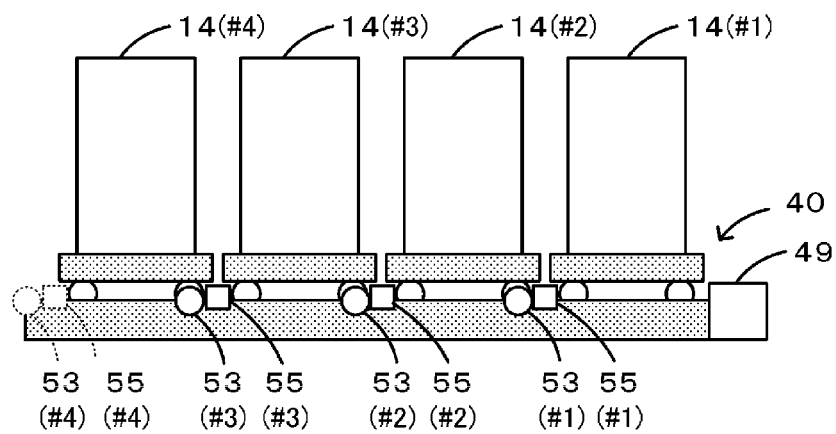
FIG. 13 is an explanatory diagram of an operation of canceling a stopper based on a detection signal of detecting sensor 54.

FIG. 13 is an explanatory diagram of the stopper cancellation operation based on the detection signal of detecting sensor 54. As illustrated in FIG. 13, when automatic movement device 30 moves to the lower portion of cart 14 (#4) when first cart 14 is unloaded, alignment control section 48 inputs the detection signal from detecting sensor 54 (#4). Then, alignment control section 48 moves stopper member 55 (#4) to the restriction canceling position, and cancels the restriction of the movement of cart 14. At this time, alignment control section 48 may ignore the signals of the detecting sensors 54 (#2 to #4) and recognition sensors 53 (#2 to #4). Subsequently, when automatic movement device 30 unloads second to fourth carts 14 (#3 to #1) from cart alignment device 40, alignment control section 48 turns off stopper members 55 (#3 to #1), respectively. When stopper device 50 is canceled, the restriction of the movement of cart 14 is canceled, so that automatic movement device 30 can unload cart 14.

Figure 14:
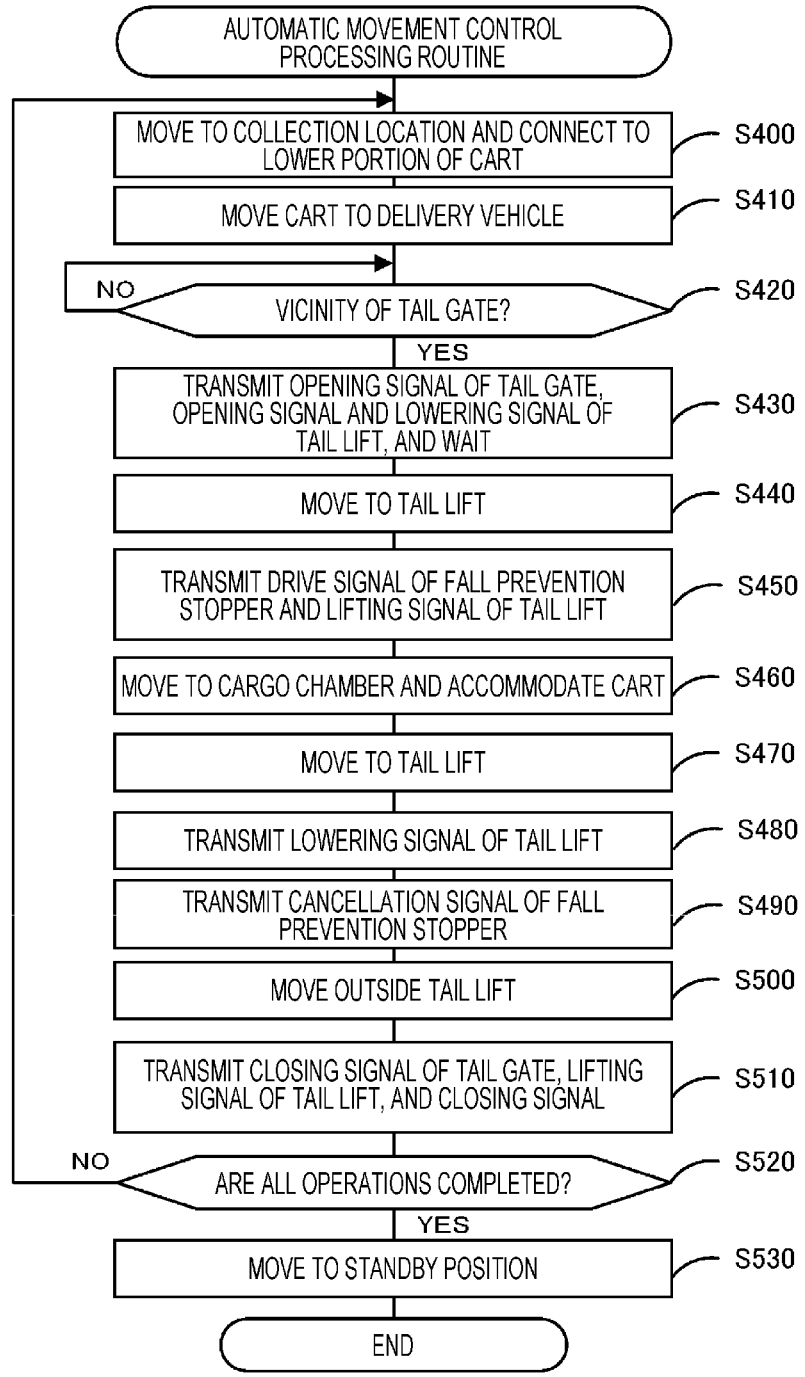
FIG. 14 is a flowchart illustrating an example of an automatic movement control processing routine.
Figure 15A:
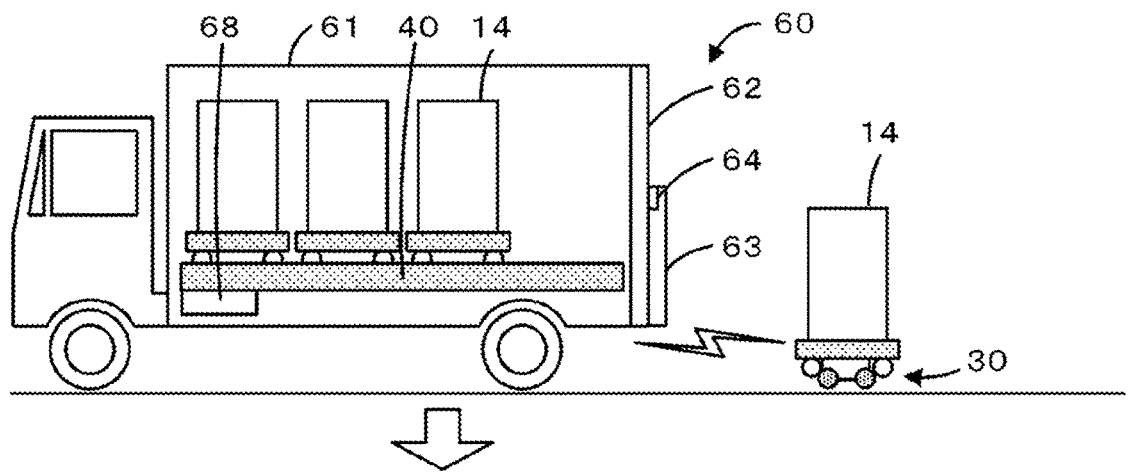
FIG. 15 is an explanatory diagram of an example in which automatic movement device 30 accommodates cart 14 in cargo chamber 61.
Figure 15B:
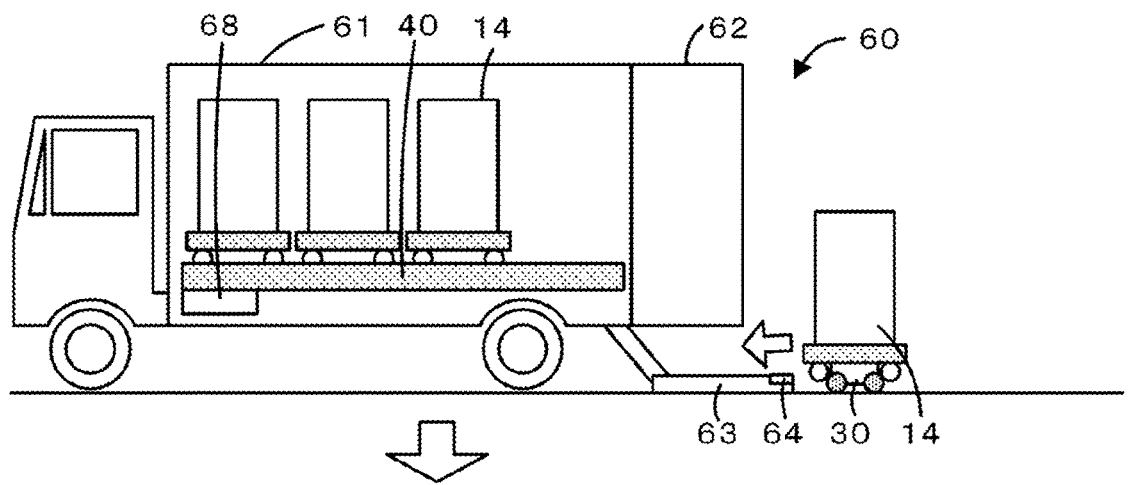

Next, processing by which automatic movement device 30 loads cart 14 into cargo chamber 61 of delivery vehicle 60 will be described. In general delivery vehicle 60, the operator performs, for example, the opening of tail gate 62 and the up-down movement of tail lift 63. In delivery system 10, since automatic movement device 30 automatically moves cart 14, automatic movement device 30 is configured to perform the operations of tail gate 62 and tail lift 63. FIG. 14 is a flowchart illustrating an example of an automatic movement control processing routine executed by movement control section 31 of automatic movement device 30. This routine is stored in the storage section of movement control section 31 and is executed when cart 14 is moved from cart alignment device 40 to delivery vehicle 60. FIG. 15 is an explanatory diagram of an example in which automatic movement device 30 accommodates cart 14 in cargo chamber 61, in which FIG. 15A is a view in which automatic movement device 30 transmits the opening signal and the lowering signal, FIG. 15B is a view in which automatic movement device 30 moves to tail lift 63, and FIG. 15C is a view in which automatic movement device 30 moves to cargo chamber 61 by lifting tail lift 63.

When this routine is started, movement control section 31 moves to the collection location for receiving cart 14 and connects to the lower portion of cart 14 that is moved this time (S400). The collection location is, for example, cart alignment device 40 in which carts 14 are collected. Next, movement control section 31 moves cart 14 to delivery vehicle 60 (S410). Movement control section 31 acquires information included in delivery management information 75 from management server 70, for example, the stop position of target delivery vehicle 60 and the movement path to the stop position, and moves based on this information.

Next, movement control section 31 determines whether automatic movement device 30 has moved to the vicinity of tail gate 62 (S420). When automatic movement device 30 is not moved to the vicinity of tail gate 62, movement control section 31 drives movement driving section 36 to move automatic movement device 30. On the other hand, when automatic movement device 30 has moved to the vicinity of tail gate 62, movement control section 31 transmits the opening signal of tail lift 63 and tail gate 62 as well as the lowering signal of tail lift 63 to delivery vehicle 60, and waits (S430 and FIG. 15A).

Figure 15C:
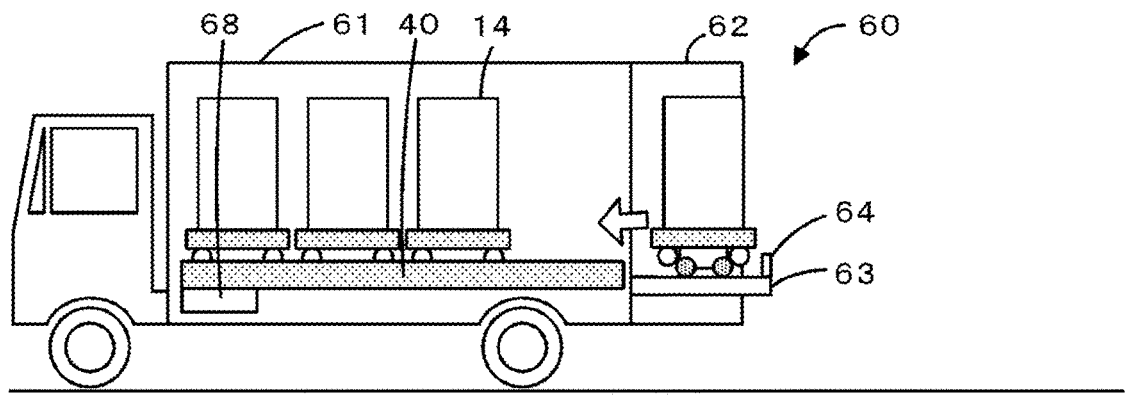

When tail lift 63 lowers to the road surface, movement control section 31 drives movement driving section 36 to move automatic movement device 30 to tail lift 63 (S440 and FIG. 15B), transmits a drive signal of fall prevention stopper 64, and transmits the lifting signal of tail lift 63 (S450 and FIG. 15C). When tail lift 63 lifts to the level of cargo chamber 61, movement control section 31 drives movement driving section 36 to cause automatic movement device 30 to move to cargo chamber 61 and accommodate cart 14 into cargo chamber 61 (S460). Automatic movement device 30 moves cart 14 to cart alignment device 40 disposed in cargo chamber 61. As cart 14 moves in arrangement direction D, casters 16 are guided by rail member 43 and are arranged in arrangement direction D. At this time, alignment control section 48 of cart alignment device 40 executes the same processing as the above-described cart counting stopper control processing routine, and executes the counting of the number of carts 14 loaded and the driving of stopper device 50.

Subsequently, movement control section 31 drives movement driving section 36, moves automatic movement device 30 to tail lift 63 (S470), and transmits the lowering signal of tail lift 63 to delivery vehicle 60 (S480). When tail lift 63 lowers to the road surface, movement control section 31 transmits the canceling signal of fall prevention stopper 64 (S490). When the restriction of the movement by fall prevention stopper 64 is canceled, movement control section 31 drives movement driving section 36 to move automatic movement device 30 to the outside of tail lift 63 (S500). When automatic movement device 30 moves to the outside of tail lift 63, movement control section 31 transmits the closing signal of tail gate 62, the lifting signal of tail lift 63, and the closing signal to delivery vehicle 60 (S510). Then, movement control section 31 determines whether the moving work of all carts 14 is completed (S520), and executes the processing of S400 and thereafter when the moving work of all carts 14 is not completed. On the other hand, when the moving work of all carts 14 is completed in S520, movement control section 31 controls movement driving section 36 such that automatic movement device 30 to the standby position is moved (S530). This routine is terminated. In this manner, since automatic movement device 30 transmits the operation signal of delivery vehicle 60, it is possible to load cart 14 in cargo chamber 61 without the operator.

Next, processing by which automatic movement device 30 provided in shop 25 unloads cart 14 from cargo chamber 61 of delivery vehicle 60 will be described. In this operation, automatic movement device 30 may perform the same processing as the automatic movement control processing routine described above. In addition, cart alignment device 40 executes processing similar to the cart counting stopper control processing routine, and executes counting of the number of carts 14 to be unloaded and cancellation of stopper device 50. For example, movement control section 31 opens tail gate 62 and tail lift 63 of delivery vehicle 60 in an empty state that is not connected to cart 14, lowers tail lift 63 to the road surface, and then drives movement driving section 36 so as to ride on tail lift 63. Next, movement control section 31 drives fall prevention stopper 64 to lift tail lift 63 to the level of cargo chamber 61. Next, movement control section 31 enters below cart 14 accommodated in cart alignment device 40 on the most entrance/exit side, lifts lift portion 34, connects thereto, and drives movement driving section 36 so as to move cart 14 to tail lift 63. Then, movement control section 31 lowers tail lift 63 to the road surface, cancels fall prevention stopper 64, and drives movement driving section 36 so as to move cart 14 to the target location. In this manner, since automatic movement device 30 transmits the operation signal of delivery vehicle 60, cart 14 can be unloaded from cargo chamber 61 without the operator.

Here, correspondences between the constituent elements of the present embodiment and constituent elements of the present disclosure will be clarified. Logistics center 20, shop 25, and cargo chamber 61 of the present embodiment correspond to a collection chamber, cart 14 corresponds to a cart, the loading section 15 corresponds to a loading section, caster 16 corresponds to a caster, first row caster 16a corresponds to a caster of the first row, and second row caster 16b corresponds to a caster of the second row. In addition, delivery system 10 corresponds to a delivery system, cart alignment device 40 corresponds to a cart alignment device, rail member 43 corresponds to a rail member, disposition section 44 corresponds to a disposition section, first row member 41 corresponds to a first row member, second row member 42 corresponds to a second row member, entrance space 47 corresponds to an entrance space, width changing section 45 corresponds to a width changing section, width driving section 46 corresponds to a width driving section, and alignment control section 48 corresponds to a width control section, an interval control section, a stopper control section, a sensor position control section, and a count control section. In addition, arrangement direction D corresponds to an arrangement direction, caster width X corresponds to a caster width, and wheel width Y corresponds to a wheel width. In addition, stopper device 50 corresponds to a stopper, stopper sensor moving section 52 corresponds to a stopper moving section and a sensor moving section, recognition sensor 53 corresponds to a recognition sensor, detecting sensor 54 corresponds to a detecting sensor, automatic movement device 30 corresponds to an automatic movement device, movement driving section 36 corresponds to a movement driving section, and the movement control section 31 corresponds to a movement control section and a transmission control section. In addition, delivery vehicle 60 corresponds to a delivery vehicle, tail gate 62 corresponds to a tail gate, tail lift 63 corresponds to a lift, and fall prevention stopper 64 corresponds to a fall prevention stopper. In the present embodiment, an example of the control method of the present disclosure is also described by describing the operation of delivery system 10.

In cart alignment device 40 of the present embodiment described above, carts 14 are arranged in the arrangement direction while casters 16 whose movement directions are changeable are guided in predetermined arrangement direction D by rail member 43 disposed and fixed in the collection chamber. Although casters 16 that freely change the movement direction are often oriented in all directions and are difficult to be aligned in an orderly manner by merely loading them into the collection chamber, in cart alignment device 40, casters 16 are aligned in arrangement direction D of rail member 43 by merely causing the casters to enter the rail member 43. Therefore, cart alignment device 40 can more easily align cart 14 in the collection chamber by a relatively simple structure called rail member 43, so that the workload on the operator can be reduced. Cart alignment device 40 includes vehicle retaining member 49 provided at the innermost portion of rail member 43 for restricting the movement of cart 14 in arrangement direction D. In cart alignment device 40, since cart 14 is fixed at the innermost portion by vehicle retaining member 49, it is easy to load carts 14 one after another.

In addition, delivery system 10 includes automatic movement device 30 that automatically moves cart 14, cart 14 has first row caster 16a and second row caster 16b, rail member 43 has first row member 41 that guides first row caster 16a and second row member 42 that guides second row caster 16b, and an entrance space into which automatic movement device 30 can enter is provided between first row member 41 and second row member 42. In cart alignment device 40, since automatic movement device 30 enters entrance space 47 formed between rail members 43, cart 14 can be easily automatically moved by the automatic movement device, so that the work of the operator can be further reduced. In addition, cart 14 has first row caster 16a and second row caster 16b, rail member 43 has first row member 41 for guiding first row caster 16a and second row member 42 for guiding second row caster 16b, and width changing section 45 capable of changing the width between first row member 41 and second row member 42 is provided. In cart alignment device 40, since the width of rail member 43 can be changed, for example, in a case where there are multiple types of carts 14 having different caster widths X, it is easy to correspond to each of carts 14. Width changing section 45 changes caster width X between first row caster 16a and second row caster 16b, and wheel width Y included in first row caster 16a and second row caster 16b. In cart alignment device 40, since the width of rail member 43 can be changed, for example, it is easy to correspond to multiple types of carts 14 having different caster widths X, and it is easy to correspond to multiple types of carts 14 having different wheel widths Y.

In addition, cart alignment device 40 controls width driving section 46 for driving width changing section 45 and the width driving section 45 depending on the type of cart 14 to change the width between first row member 41 and second row member 42. In cart alignment device 40, since the width of rail member 43 can be automatically changed, it is possible to further reduce the work of the operator in a case where there are multiple types of carts 14. Furthermore, cart alignment device 40 includes stopper device 50 provided within a predetermined range of rail member 43 according to the arrangement interval of carts 14 for fixing carts 14. In cart alignment device 40, since the movement of cart 14 is restricted by stopper device 50 provided in accordance with the arrangement interval even if one or more carts 14 are loaded into rail member 43, it is possible to further suppress damage or the like to the articles loaded on cart 14, which may be caused by the movement of cart 14. Since stopper device 50 is provided on vertical surfaces 41d and 42d of rail member 43 on the side surface of the wheel of caster 16, it is preferable that stopper device 50 does not relatively obstruct the traveling or movement of cart 14. In particular, it is possible to further improve the traveling stability of caster 16 as compared with a case where stopper device 50 is disposed on the traveling surface of caster 16. In addition, stopper device 50 includes stopper member 55 formed with restricting surface 56 against which caster 16 abuts to restrict the movement of cart 14, and stopper driving section 57 for moving stopper member 55 between the restricted position for restricting the movement of cart 14 and the canceling position for allowing cart 14 to move. In stopper device 50, since stopper member 55 automatically moves, it is possible to further reduce the work of the operator as compared with the case where the operator manually performs the work.

Furthermore, cart alignment device 40 includes stopper sensor moving section 52 that moves stopper device 50 along rail member 43 and fixes the same at a position according to the arrangement interval of carts 14. In cart alignment device 40, for example, in a case where there are multiple types of carts 14 having different lengths of carts 14 or different intervals of casters 16, the multiple types of carts 14 can be easily moved and restricted by automatically moving and automatically fixing stopper device 50 to a position compatible with cart 14. Cart alignment device 40 controls stopper sensor moving section 52 depending on the type of cart 14 and adjusts the interval between stopper devices 50. In cart alignment device 40, since the interval between stopper devices 50 is automatically adjusted, in a case where there are multiple types of carts 14 requiring the interval adjustment of stopper devices 50, it is possible to further reduce the work of the operator. Cart alignment device 40 inputs signals from recognition sensor 53 for recognizing cart 14 existing in a predetermined range of rail member 43, detecting sensor 54 for detecting an object to move cart 14, and recognition sensor 53 and detecting sensor 54 to drive and control stopper device 50 such that the movement of cart 14 is restricted and the restriction of the movement of the cart is canceled. In cart alignment device 40, since stopper device 50 is controlled by using recognition sensor 53 and detecting sensor 54 to restrict the movement of cart 14 in rail member 43, it is possible to further reduce the work of the operator in changing the state of stopper device 50.

In addition, cart alignment device 40 includes stopper sensor moving section 52 that moves recognition sensor 53 and detecting sensor 54 along rail member 43, and fixes them at a position according to the arrangement interval of carts 14. In cart alignment device 40, since recognition sensor 53 and detecting sensor 54 can be moved depending on the type of cart 14, the recognition of cart 14 and the detection of the object that moves cart 14 can be performed even if the type of cart 14 is changed. In addition, cart alignment device 40 controls stopper sensor moving section 52 depending on the type of cart 14 to move and fix recognition sensor 53 and detecting sensor 54. In cart alignment device 40, since the position at which recognition sensor 53 and detecting sensor 54 are fixed can be automatically moved and fixed depending on the type of the cart, it is possible to further reduce the work of the operator in changing the positions of the sensors.

In addition, cart alignment device 40 receives a signal from recognition sensor 53 and counts the number of carts 14 loaded into cart alignment device 40 and the number of carts 14 unloaded from cart alignment device 40. In cart alignment device 40, it is possible to more accurately grasp the number of carts 14 loaded or unloaded while reducing the workload on the operator such as the counting of carts 14. Cart alignment device 40 is disposed in the collection chamber of the delivery source in which multiple carts 14 are collected and counts the number of carts 14 loaded into cart alignment device 40 fixed in the collection chamber of the delivery source and unloaded from cart alignment device 40. In cart alignment device 40, it is possible to grasp the number of carts 14 loaded and unloaded into and from the collection chamber of the delivery source while reducing the workload on the operator. In addition, cart alignment device 40 outputs the collection completion signal when the delivery destination of cart 14 is set and the number of carts loaded into cart alignment device 40 reaches the delivery quantity to the delivery destination, and outputs the delivery permission signal when the number of carts 14 unloaded from cart alignment device 40 reaches the delivery quantity to the delivery destination. In cart alignment device 40, it is possible to grasp the completion of the loading and unloading operations by using the counted number of carts 14. In addition, cart alignment device 40 is disposed and fixed in cargo chamber 61 serving as the collection chamber provided in delivery vehicle 60 that accommodates and delivers one or more carts 14. In cart alignment device 40, it is possible to grasp the number of carts loaded and unloaded by delivery vehicle 60 while reducing the workload on the operator.

In addition, automatic movement device 30 of the present embodiment transmits the opening signal of the closure door of tail gate 62 to delivery vehicle 60, and delivery vehicle 60 receiving the signal performs an operation for opening the closure door. For example, when automatic movement device 30 automatically moves to the vicinity of delivery vehicle 60 and then transmits the opening signal, cart 14 can be loaded and unloaded in a state where the operator is not necessary. Therefore, in automatic movement device 30, it is possible to further reduce the workload on the operator in delivery system 10 of the article for automatically moving cart 14.

In addition, automatic movement device 30 transmits the closing signal of the closure door of tail gate 62 every time a predetermined delivery quantity of carts 14 is loaded into the collection chamber and then a predetermined delivery quantity of carts 14 is unloaded from the collection chamber. In automatic movement device 30, since the closure door is closed every time the cart is unloaded to the collection chamber, it is preferable from the viewpoint of security, and it is also advantageous in a case where the temperature control of the collection chamber is required. In addition, delivery vehicle 60 includes tail lift 63 that loads and moves up and down the cart 60, and fall prevention stopper 64 that is provided at the distal end of tail lift 63 and operates between the restricted position for restricting the movement of cart 14 and the restriction canceling position to prevent cart 14 from falling, on tail gate 62, so that automatic movement device 30 transmits the lift control signal for controlling the up-down movement of tail lift 63 and the control signal for driving the fall prevention stopper to delivery vehicle 60. In automatic movement device 30, since tail lift 63 and fall prevention stopper 64 are automatically driven, it is possible to further reduce the workload performed by the operator.

In cart alignment device 40, since caster 16 passes through the traveling surface of rail member 43 that is higher than the floor surface, the moving height of loading section 15 of cart 14 is increased. Therefore, the lowering of the height of automatic movement device 30 is mitigated. In addition, in cart alignment device 40, since cart 14 can be fixed by stopper device 50, it is possible to secure higher safety during the operation. Furthermore, assuming that cart alignment device 40 is used in logistics center 20, since the receiving position of automatic movement device 30 can be more accurately determined as compared with a case where carts 14 are collected in a predetermined area in logistics center 20, it is possible to reduce the processing by which carts 14 search for carts 14, so that the connection can be performed more easily. In addition, since the number of carts is counted by cart alignment device 40, it is possible to prevent forgetting to load cart 14, or the like.

It is needless to say that the present disclosure is not limited to the embodiments described above, and various forms can be implemented within the technical scope of the present disclosure.

For example, in the above embodiments, cart 14 is automatically moved by automatic movement device 30, however, the configuration is not particularly limited to this, and automatic movement device 30 may be omitted so that the operator moves cart 14 to cart alignment device 40. Even with cart alignment device 40, since casters 16 are arranged in arrangement direction D by merely causing caster 16 to enter rail member 43, it is possible to more easily align carts 14 in the collection chamber, so that it is possible to further reduce the workload on the operator. At this time, cart alignment device 40 may not have entrance space 47 through which automatic movement device 30 passes. Detecting sensor 54 may be a sensor for detecting the operator.

In the above embodiments, rail member 43 is separated into first row member 41 and second row member 42, so that caster width X can be changed, however, the configuration is not particularly limited to this, and they may be integrated with each other. In this case, cart alignment device 40 may use rail member 43 having unique caster width X for each of carts 14 having different caster widths X. In cart alignment device 40 as well, since casters 16 are arranged in arrangement direction D, it is possible to more easily align carts 14 in the collection chamber, so that it is possible to further reduce the workload on the operator. In rail member 43, width changing section 45 and width driving section 46 can be omitted.

In the above embodiments, rail member 43 has a structure capable of changing caster width X and wheel width Y, however, the configuration is not particularly limited to this, and only caster width X may be changed. In this case, main body 41a, lower member 41b, and guide member 41c can be integrated with each other. Alternatively, rail member 43 may be able to change only wheel width Y.

In the above embodiments, width driving section 46 for driving width changing section 45 is provided, and alignment control section 48 controls width driving section 46 so that caster width X and wheel width Y can be automatically changed, however, the present disclosure is not particularly limited to this, and the control functions of width driving section 46 and alignment control section 48 may be omitted so that the operator changes any one or more of caster width X and wheel width Y. In cart alignment device 40, the workload on the operator for changing the width is slightly increased, but cart 14 can be aligned in the collection chamber with a simpler configuration.

Figure 16:
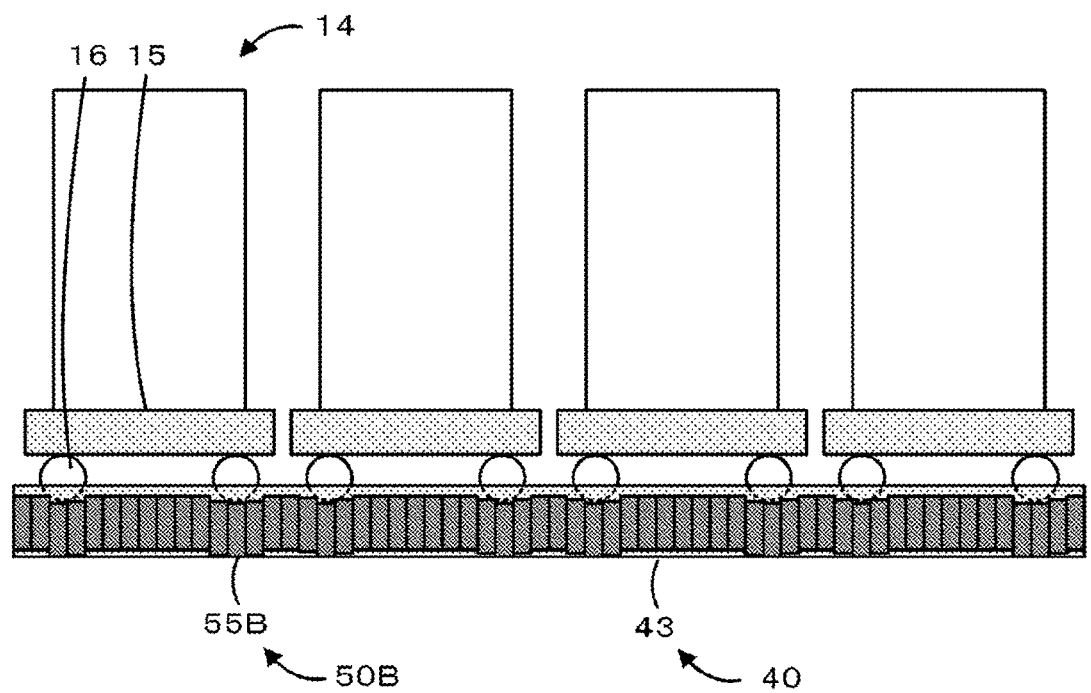
FIG. 16 is an explanatory diagram of an example of another stopper device 50B.

In the above embodiments, cart alignment device 40 includes stopper device 50 where stopper member 55 protrudes from the side surface side, however, the configuration is not particularly limited to this as long as the movement of cart 14 can be restricted. For example, stopper device 50 may be disposed on one or more of the traveling surface of rail member 43 on which the wheels of caster 16 travel, the side surface in the collection chamber on the side surface side of cart 14, and the ceiling surface in the collection chamber above cart 14. In addition, although stopper device 50 is configured to restrict the movement of cart 14 by protruding stopper member 55, as illustrated in FIG. 16, the movement of cart 14 may be restricted by stopper member 55B that recesses the traveling surface. FIG. 16 is an explanatory diagram of an example of another stopper device 50B. Even in such cart alignment device 40, it is possible to prevent unintentional movement of cart 14 in the collection chamber.

In the above embodiments, cart alignment device 40 includes stopper device 50, however, the configuration is not particularly limited to this, and stopper device 50 for driving stopper member 55 may be omitted. In cart alignment device 40, carts 14 can be aligned in the collection chamber with a simpler configuration.

In the above embodiments, stopper device 50 has stopper sensor moving section 52, and the movement of stopper member 55 and the movement of each sensor are performed by one configuration, however, the configuration is not particularly limited to this, and may have three types of a moving section of stopper member 55, a moving section of recognition sensor 53, and a moving section of detecting sensor 54, respectively, or may have two types of moving sections in any combination. It is preferable that the smaller number of moving sections for moving the configuration can have a simpler configuration. Alternatively, in the above embodiments, stopper sensor moving section 52 is controlled by alignment control section 48 to automatically move and fix stopper member 55, recognition sensor 53, and detecting sensor 54, however, the configuration is not particularly limited to this, and the functions of movement control of stopper sensor moving section 52 and alignment control section 48 may be omitted, so that the operator moves and fixes the positions of stopper member 55, recognition sensor 53, and detecting sensor 54. In stopper device 50, the workload for changing the position by the operator is slightly increased, but the movement of cart 14 can be restricted in the collection chamber with a simpler configuration.

In the above embodiments, stopper driving section 57 is controlled by alignment control section 48 to move stopper member 55 to the restricted position and the restriction canceling position, however, the configuration is not particularly limited to this, and the control functions of stopper driving section 57 and alignment control section 48 may be omitted, and the position of stopper member 55 may be switched by the operator. In stopper device 50, the workload for switching the position of stopper member 55 by the operator is slightly increased, but the movement of cart 14 can be restricted in the collection chamber with a simpler configuration.

In the above embodiments, alignment control section 48 of cart alignment device 40 has a function of the count control section and outputs the loading completion information (collection completion signal) and the unloading completion information (delivery permission signal) to logistics PC 21, however, the configuration is not particularly limited to this, and control section 22 of logistics PC 21 may have the function of the count control section and output the loading completion information (collection completion signal) and the unloading completion information (delivery permission signal) to the display section or the like. Alternatively, cart alignment device 40 may omit the counting of carts 14. In addition, although alignment control section 48 has the functions of the width control section, the interval control section, the stopper control section, and the sensor position control section, and is configured to perform the processing thereof, however, the configuration is not particularly limited to this, and any one or more of the functions may be owned by any one or more of other control sections, such as control section 22 of logistics PC 21, control section 27 of shop PC 26, management control section 71, and movement control section 31, or may be shared by multiple control sections to perform the processing of the above functions. Alternatively, in cart alignment device 40, alignment control section 48 has functions of the width control section, the interval control section, the stopper control section, the sensor position control section, and the count control section, but one or more of these functions may be omitted. In cart alignment device 40, carts 14 can be aligned in the collection chamber with a simpler configuration.

In the above embodiments, the signal is input from the recognition sensor, and the number of carts 14 loaded into cart alignment device 40 and the number of carts 14 unloaded from cart alignment device 40 are counted, however, the configuration is not particularly limited to this, and any one of the number thereof may be counted or the counting of the number of carts 14 may be omitted. Also in cart alignment device 40, cart 14 can be aligned in the collection chamber with a simpler configuration.

In the above embodiments, automatic movement device 30 is described as being the AMR, however, the configuration is not particularly limited to this, and may be an automatic guided vehicle (AGV) that moves on a predetermined road. Also in automatic movement device 30, cart 14 can be automatically moved, so that the workload on the operator can be further reduced. In a case where automatic movement device 30 is the AGV, non-contact sensor 37 may have a simpler configuration, or may be omitted.

In the above embodiments, although automatic movement device 30 transmits the closing signal or the opening signal of the closure door of tail gate 62 to delivery vehicle 60 every time cart 14 is loaded into cargo chamber 61 serving as the collection chamber or every time cart 14 is unloaded from cargo chamber 61, however, the configuration is not particularly limited to this. For example, when automatic movement device 30 transmits the closing signal after cart 14 of a predetermined delivery quantity is loaded into the collection chamber, the closure door is closed so that the delivery vehicle can be delivered to the delivery destination. In addition, when automatic movement device 30 transmits the closing signal after cart 14 of a predetermined delivery quantity is unloaded from the collection chamber, the closure door is closed so that the delivery vehicle can be moved from the delivery destination.

In the above embodiments, automatic movement device 30 is configured to transmit the opening signal or the closing signal of the closure door, the opening signal, the closing signal, and the up-down signal of tail lift 63, and the control signal of fall prevention stopper 64, or the like, to controller 68 of delivery vehicle 60, however, the configuration is not particularly limited to this, and, for example, one or more of them may be omitted, or all of them may be omitted. In automatic movement device 30, the workload on the operator is slightly increased, but cart 14 can be automatically moved with a simpler configuration. In addition, delivery vehicle 60 may not have any one or more of tail gate 62, tail lift 63, fall prevention stopper 64, and controller 68.

In the above embodiments, automatic movement device 30 includes mecanum wheel 35 and is movable in an endless manner in the vertical and horizontal directions, however, the configuration is not particularly limited to this as long as the same is configured to be able to travel. It may have a normal wheel. At this time, automatic movement device 30 may include four wheels, three wheels, or two main wheels and one or more sub wheels.

In the above embodiments, cart alignment device 40 is disposed and fixed to both logistics center 20 and delivery vehicle 60, however, the configuration is not particularly limited to this, and may be disposed and fixed to any one of logistics center 20 and delivery vehicle 60 to be used.

In the above embodiments, the present disclosure has been described as delivery system 10 and cart alignment device 40, however, the configuration is not particularly limited to this, and may be a control method used in a delivery system.

Here, the present disclosure may be configured as follows. For example, in the cart alignment device of the present disclosure, the delivery system may include an automatic movement device that automatically moves the cart, the cart may include the caster in a first row and the caster in a second row, the rail member may include a first row member that guides the caster in the first row and a second row member that guides the caster in the second row, and may have an entrance space into which the automatic movement device enters between the first row member and the second row member. In this cart alignment device, since the automatic movement device enters the entrance space formed between the rail members, the cart can be easily automatically moved by the automatic movement device, so that the work of the operator can be further reduced.

In the cart alignment device of the present disclosure, the cart may include the caster in a first row and the caster in a second row, the rail member may include a first row member that guides the caster in the first row, and a second row member that guides the caster in the second row, and the cart alignment device may further include a width changing section configured to change the width between the first row member and the second row member. In this cart alignment device, since the width of the rail member can be changed, for example, in a case where there are multiple types of carts having different caster widths, it is easy to apply to each cart.

In the cart alignment device of the present disclosure including a width changing section, the width changing section may change at least one of a caster width between the caster in the first row and the caster in the second row, and a wheel width of the caster in the first row and the caster in the second row. In this cart alignment device, since the width of the rail member can be changed, it is easy to be applied to, for example, multiple types of carts having different caster widths, or to multiple types of carts having different wheel widths.

The cart alignment device of the present disclosure including a width changing section may include a width driving section configured to drive the width changing section, and a width control section configured to control the width driving section depending on a type of the cart and change the width between the first row member and the second row member. In this cart alignment device, since the width of the rail member can be automatically changed, it is possible to further reduce the work of the operator in a case where there are multiple types of carts.

The cart alignment device according to the present disclosure may include a stopper provided within a predetermined range of the rail member according to an arrangement interval of the carts and configured to fix the cart. In this cart alignment device, since the movement of the cart is restricted by the stopper provided in accordance with the arrangement interval even if one or more carts are loaded into the rail member, it is possible to further suppress damage or the like to the articles loaded on the cart, which may be caused by the movement of the cart. At this time, the stopper may be disposed on one or more of a traveling surface of the rail member on which the wheels of the caster travel, a vertical surface of the rail member on the side surface side of the wheels of the caster, a side surface in the collection chamber on the side surface side of the cart, and a ceiling surface in the collection chamber on the upper side of the cart. In addition, the stopper may include a stopper member on which a restricting surface against which the caster abuts to restrict the movement of the cart is formed, and a stopper driving section for moving the stopper member between a restricted position for restricting the movement of the cart and a canceling position for allowing the cart to move.

The cart alignment device of the present disclosure including a stopper may include a stopper moving section configured to move the stopper along the rail member and fix the stopper at a position according to the arrangement interval of the carts. In this cart alignment device, for example, in a case where there are multiple types of carts having different lengths or caster intervals of the carts, it is possible to easily restrict the movements of multiple types of carts by moving and fixing the stopper to a position compatible with the cart.

The cart alignment device of the present disclosure including a stopper moving section may include an interval control section configured to control the stopper moving section depending on a type of the cart and adjust an interval between the stoppers. In this cart alignment device, since the interval control section adjusts the interval between the stoppers, in a case where there are multiple types of carts requiring the interval adjustment of the stoppers, it is possible to further reduce the work of the operator.

The cart alignment device of the present disclosure including a stopper may include a recognition sensor configured to recognize the cart existing in the predetermined range, a detecting sensor configured to detect an object for moving the cart, and a stopper control section configured to input signals from the recognition sensor and the detecting sensor, and drive and control the stopper such that the movement of the cart is restricted and/or the restriction of the movement of the cart is canceled. In this cart alignment device, since the stopper is controlled by using the recognition sensor for recognizing the cart and the detecting sensor for detecting the object for moving the cart to restrict the movement of the cart in the rail member, it is possible to further reduce the work of the operator in changing the state of the stopper.

The cart alignment device of the present disclosure including a recognition sensor and a detecting sensor may include a sensor moving section configured to move the recognition sensor and the detecting sensor along the rail member and fix the recognition sensor and the detecting sensor at positions according to the arrangement interval of the carts. In this cart alignment device, since the recognition sensor and the detecting sensor can be moved depending on the type of cart, it is possible to recognize the cart and detect the object that moves the cart even if the type of cart is changed.

The cart alignment device of the present disclosure including the sensor moving section may include a sensor position control section configured to control the sensor moving section depending on a type of the cart, and move and fix the recognition sensor and the detecting sensor. In this cart alignment device, since the position at which the recognition sensor and the detecting sensor are fixed can be automatically moved and fixed depending on the type of the cart, it is possible to further reduce the work of the operator in changing the position of the sensor.

The cart alignment device of the present disclosure may include a recognition sensor configured to recognize the cart existing in a predetermined range of the rail member according to an arrangement interval of the carts, and a count control section configured to input a signal from the recognition sensor and count the number of the carts loaded into the cart alignment device and/or the number of the carts unloaded from the cart alignment device. In this cart alignment device, the number of carts loaded or unloaded can be grasped while reducing the workload on the operator.

In the cart alignment device of the present disclosure including a count control section, the disposition section may dispose and fix the rail member in the collection chamber of a delivery source in which multiple the carts are collected, and the count control section may count the number of the carts loaded into the cart alignment device disposed and fixed in the collection chamber of the delivery source and/or unloaded from the cart alignment device. In this cart alignment device, it is possible to grasp the number of carts loaded or unloaded in the collection chamber of the delivery source while reducing the workload on the operator.

In the cart alignment device of the present disclosure including a count control section, the cart alignment device may be configured to set a delivery destination of the cart, the count control section may output a collection completion signal when the number of the carts loaded into the cart alignment device reaches a delivery quantity to the delivery destination, and output a delivery permission signal when the number of the carts unloaded from the cart alignment device reaches the delivery quantity to the delivery destination. In this cart alignment device, the completion of the loading and unloading operations can be grasped by using the counted number of carts.

Alternatively, the disposition section may dispose and fix the rail member in the collection chamber included in the delivery vehicle that accommodates and delivers one or more of the carts. In this cart alignment device, it is possible to grasp the number of carts loaded or unloaded by the delivery vehicle while reducing the workload on the operator.

The automatic movement device according to the present disclosure that is used in a delivery system for delivering an article using a cart including a loading section for loading articles and a caster disposed in the loading section and having wheels capable of changing a movement direction of the loading section, and automatic moves the cart including:
 a movement driving section configured to drive the automatic movement device to travel; and
 a transmission control section configured to control the movement driving section, and transmit an opening signal of the closure door to a delivery vehicle including a collection chamber for accommodating one or more carts and a closure door for opening and closing the collection chamber.

In the automatic movement device, the opening signal of the closure door is transmitted to the delivery vehicle, and the delivery vehicle receiving the signal performs an operation for opening the closure door. For example, when the automatic movement device automatically moves to the vicinity of the delivery vehicle and then transmits the opening signal, the operator can perform loading and unloading of the cart in a state where the operator is not required. Therefore, in the automatic movement device, it is possible to further reduce the workload on the operator in the delivery system of the article for automatically moving the cart. Here, the automatic movement device may be an Automatic Guided Vehicle (AGV) that moves on a predetermined road, or may be an Autonomous Mobile Robot (AMR) that detects the surroundings and moves on a free route.

In the automatic movement device according to the present disclosure, the transmission control section may transmit a closing signal of the closure door at any of after the cart of a predetermined delivery quantity is loaded into the collection chamber, after the cart of a predetermined delivery quantity is unloaded from the collection chamber, every time the cart is loaded into the collection chamber, and every time the cart is unloaded from the collection chamber. In this automatic movement device, for example, when the closing signal is transmitted after the cart of a predetermined delivery quantity is loaded into the collection chamber, the closure door is closed so that the delivery vehicle can be delivered to the delivery destination. In addition, when the automatic movement device transmits the closing signal after the cart of a predetermined delivery quantity is unloaded from the collection chamber, the closure door is closed so that the delivery vehicle can be moved from the delivery destination. In addition, when the automatic movement device transmits the closing signal every time the cart is unloaded to the collection chamber, since the closure door is closed every time, it is preferable from the viewpoint of security, and it is also effective in a case where the temperature control of the collection chamber is required. In addition, when the automatic movement device transmits the closing signal every time the cart is unloaded from the collection chamber, since the closure door is closed every time, it is preferable from the viewpoint of security and it is also effective in a case where the temperature control of the collection chamber is required.

In the automatic movement device according to the present disclosure, the delivery vehicle may include a lift configured to load and move up and down the cart, a fall prevention stopper configured to operate between a restricted position and a restriction canceling position provided at a distal end of the lift to restrict the movement of the cart to prevent the cart from falling, on a tail gate, and the transmission control section may transmit a lift control signal for controlling the up-down movement of the lift and/or a stopper control signal for driving the fall prevention stopper to the delivery vehicle. In this automatic movement device, since the lift and the fall prevention stopper are automatically driven, it is possible to further reduce the workload performed by the operator.

The delivery system of the present disclosure is a delivery system that delivers an article using a cart including a loading section for loading articles and a caster disposed in the loading section and having wheels capable of changing a movement direction of the loading section, the delivery system includes the cart alignment device as described above, and an automatic movement device configured to automatically move the cart including a movement driving section for traveling and driving. Since the delivery system includes any of the cart alignment devices described above, any of the advantages described above can be obtained according to the adopted mode. The delivery system may include any of the automatic movement devices described above.

The control method of the present disclosure is a control method used in a delivery system for delivering articles using a cart including a loading section for loading articles and a caster disposed in the loading section and having wheels capable of changing a movement direction of the loading section, and a cart alignment device including a rail member configured to guide the caster of the cart in a predetermined arrangement direction, a disposition section configured to dispose and fix the rail member in a collection chamber for accommodating one or more carts, and a stopper provided within a predetermined range of the rail member according to an arrangement interval of the carts and configured to fix the cart, the control method including:
  a recognizing step of recognizing the cart existing in the predetermined range;
  a detecting step of detecting an object for moving the cart; and
  a controlling step of inputting a signal recognizing the cart and a signal detecting the object, and driving and controlling the stopper such that the movement of the cart is restricted and/or the restriction of the movement of the cart is canceled.

In this control method, since the cart is recognized, the object for moving the cart is detected, and the stopper is controlled to restrict the movement of the cart in the rail member, it is possible to further reduce the work of the operator in changing the state of the stopper. In addition, since the cart alignment device is used, it is possible to more easily align the cart in the collection chamber by a relatively simple structure called a rail member, so that it is possible to further reduce the workload on the operator. In this control method, various modes of the above-described cart alignment device may be adopted, or a step of realizing each function of the above-described cart alignment device may be added.

The control method of the present disclosure is a control method used in a delivery system for delivering articles using a cart including a loading section for loading articles and a caster disposed in the loading section and having wheels capable of changing a movement direction of the loading section, and a cart alignment device including a rail member configured to guide the caster of the cart in a predetermined arrangement direction, and a disposition section configured to dispose and fix the rail member in a collection chamber for accommodating one or more carts, the control method including:
  a recognizing step of recognizing the cart existing in a predetermined range of the rail member according to an arrangement interval of the carts;
  a counting step of inputting a signal recognizing the cart and counting the number of the carts loaded into the cart alignment device and/or the number of the carts unloaded from the cart alignment device; and
  an outputting step of outputting the number of the carts counted in the counting step.

According to this control method, in this cart alignment device, it is possible to grasp the number of carts loaded or unloaded while reducing the workload on the operator. In addition, since the cart alignment device is used, it is possible to more easily align the cart in the collection chamber by a relatively simple structure called a rail member, so that it is possible to further reduce the workload on the operator. In this control method, various modes of the above-described cart alignment device may be adopted, or a step of realizing each function of the above-described cart alignment device may be added.

The control method of the present disclosure is a control method of an automatic movement device that is used in a delivery system for delivering an article using a cart including a loading section for loading articles and a caster disposed in the loading section and having wheels capable of changing a movement direction of the loading section, and automatic moves the cart, the control method including:

a driving step of controlling the movement driving section configured to drive the automatic movement device to travel and driving the automatic movement device to travel; and a transmitting step of transmitting an opening signal of the closure door to a delivery vehicle including a collection chamber for accommodating one or more carts and a closure door for opening and closing the collection chamber.

In this control method, since the automatic movement device transmits the opening signal of the closure door to the delivery vehicle, it is possible to perform loading and unloading of the cart in a state where the operator is not required. Therefore, in this control method, it is possible to further reduce the workload on the operator in the delivery system of the article for automatically moving the cart. In this control method, various modes of the above-described automatic movement device may be adopted, or a step of realizing each function of the above-described automatic movement device may be added.

INDUSTRIAL APPLICABILITY

The cart alignment device, the automatic movement device, the delivery system, and the control method of the present disclosure can be used in the technical field of a product distribution system for delivering products.

REFERENCE SIGNS LIST 10 delivery system, 12 network, 14 cart, 15 loading section, 16 caster, 16a first row caster, 16b second row caster, 20 logistics center, 21 logistics PC, 22 control section, 23 storage section, 24 communication section, 25 shop, 26 shop PC, 27 control section, 28 storage section, 29 communication section, 30 automatic movement device, 31 movement control section, 32 storage section, 34 lift portion, 35 mecanum wheel, 36 movement driving section, 37 non-contact sensor, 38 communication section, 40 cart alignment device, 41 first row member, 41a main body, 41b lower member, 41c guide member, 41d vertical surface, 42 second row member, 42a main body, 42b lower member, 42c guide member, 42d vertical surface, 43 rail member, 44 disposition section, 45 width changing section, 46 width driving section, 47 entrance space, 48 alignment control section, 49 vehicle retaining member, 50, 50B stopper device, 51 main body, 52 stopper sensor moving section, 53 recognition sensor, 54 detecting sensor, 55, 55B stopper member, 56 restricting surface, 57 stopper driving section, 58 communication section, 60 delivery vehicle, 61 cargo chamber, 62 tail gate, 63 tail lift, 64 fall prevention stopper, 68 controller, 70 management server, 71 management control section, 72 CPU, 73 storage section, 75 delivery management information, 76 cart information, 78 communication section, D arrangement direction, L stopper interval, X caster width, Y wheel width

The invention claimed is:

1. A cart alignment device used in a delivery system that delivers an article using a cart including a loading section for loading articles and a caster disposed in the loading section and having wheels capable of changing a movement direction of the loading section, the cart alignment device comprising:

a rail member configured to guide the caster of the cart in a predetermined arrangement direction; and a disposition section configured to dispose and fix the rail member in a collection chamber for accommodating one or more carts, wherein the cart includes the caster in a first row and the caster in a second row, the rail member includes a first row member that guides the caster in the first row and a second row member that guides the caster in the second row, and the cart alignment device further comprises a width changing section configured to change the width between the first row member and the second row member.

2. The cart alignment device according to claim 1, wherein the delivery system includes an automatic movement device that automatically moves the cart, the cart includes the caster in a first row and the caster in a second row, and the rail member includes a first row member that guides the caster in the first row and a second row member that guides the caster in the second row, and has an entrance space into which the automatic movement device enters between the first row member and the second row member.

3. The cart alignment device according to claim 1, wherein the width changing section changes at least one of a caster width between the caster in the first row and the caster in the second row, and a wheel width of the caster in the first row and the caster in the second row.

4. The cart alignment device according to claim 1, further comprising:

a width driving section configured to drive the width changing section, and a width control section configured to control the width driving section depending on a type of the cart and change the width between the first row member and the second row member.

5. The cart alignment device according to claim 1, further comprising:

a stopper provided within a predetermined range of the rail member according to an arrangement interval of the carts and configured to fix the cart.

6. The cart alignment device according to claim 5, further comprising:

a stopper moving section configured to move the stopper along the rail member and fix the stopper at a position according to the arrangement interval of the carts.

7. The cart alignment device according to claim 6, further comprising:

an interval control section configured to control the stopper moving section depending on a type of the cart and adjust an interval between the stoppers.

8. The cart alignment device according to claim 5, further comprising:

a recognition sensor configured to recognize the cart existing in the predetermined range, a detecting sensor configured to detect an object for moving the cart, and a stopper control section configured to input signals from the recognition sensor and the detecting sensor, and drive and control the stopper such that the movement of the cart is restricted and/or the restriction of the movement of the cart is canceled.

9. The cart alignment device according to claim 8, further comprising:

a sensor moving section configured to move the recognition sensor and the detecting sensor along the rail member and fix the recognition sensor and the detecting sensor at positions according to the arrangement interval of the carts.

10. The cart alignment device according to claim 9, further comprising:
a sensor position control section configured to control the sensor moving section depending on a type of the cart, and move and fix the recognition sensor and the detecting sensor.

11. The cart alignment device according to claim 1, further comprising:
a recognition sensor configured to recognize the cart existing in a predetermined range of the rail member according to an arrangement interval of the carts, and
a count control section configured to input a signal from the recognition sensor and count a number of the carts loaded into the cart alignment device and/or the number of the carts unloaded from the cart alignment device.

12. The cart alignment device according to claim 11,
wherein the disposition section disposes and fixes the rail member in the collection chamber of a delivery source in which multiple carts are collected, and
the count control section counts the number of the carts loaded into the cart alignment device disposed and fixed in the collection chamber of the delivery source and/or unloaded from the cart alignment device.

13. The cart alignment device according to claim 11,
wherein in the cart alignment device, a delivery destination of the cart is set, and
the count control section outputs a collection completion signal when the number of the carts loaded into the cart alignment device reaches a delivery quantity to the delivery destination, and outputs a delivery permission signal when the number of the carts unloaded from the cart alignment device reaches the delivery quantity to the delivery destination.

14. A delivery system that delivers an article using a cart including a loading section for loading articles and a caster disposed in the loading section and having wheels capable of changing a movement direction of the loading section, the delivery system comprising:
the cart alignment device according to claim 1; and
an automatic movement device configured to include a movement driving section for traveling and automatically move the cart.

15. A control method used in a delivery system for delivering articles using a cart including a loading section for loading articles and a caster disposed in the loading section and having wheels capable of changing a movement direction of the loading section, and a cart alignment device including a rail member configured to guide the caster of the cart in a predetermined arrangement direction, a disposition section configured to dispose and fix the rail member in a collection chamber for accommodating one or more carts, and a stopper provided within a predetermined range of the rail member according to an arrangement interval of the carts and configured to fix the cart, the control method comprising:
a recognizing step of recognizing the cart existing in the predetermined range;
a detecting step of detecting an object for moving the cart; and
a controlling step of inputting a signal recognizing the cart and a signal detecting the object, and driving and controlling the stopper such that the movement of the cart is restricted and/or the restriction of the movement of the cart is canceled.

16. A control method used in a delivery system for delivering articles using a cart including a loading section for loading articles and a caster disposed in the loading section and having wheels capable of changing a movement direction of the loading section, and a cart alignment device including a rail member configured to guide the caster of the cart in a predetermined arrangement direction, and a disposition section configured to dispose and fix the rail member in a collection chamber for accommodating one or more carts, the control method comprising:
a recognizing step of recognizing the cart existing in a predetermined range of the rail member according to an arrangement interval of the carts;
a counting step of inputting a signal recognizing the cart and counting the number of the carts loaded into the cart alignment device and/or the number of the carts unloaded from the cart alignment device; and
an outputting step of outputting the number of the carts counted in the counting step.

* * * * *